(12) United States Patent
Ueda et al.

(10) Patent No.: US 8,953,042 B2
(45) Date of Patent: Feb. 10, 2015

(54) VEHICLE-MOUNTED DEVICE IDENTIFYING APPARATUS

(75) Inventors: Shinsuke Ueda, Utsunomiya (JP); Akio Takahashi, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 13/604,829

(22) Filed: Sep. 6, 2012

(65) Prior Publication Data

US 2013/0063596 A1 Mar. 14, 2013

(30) Foreign Application Priority Data

Sep. 8, 2011 (JP) ................................. 2011-195686

(51) Int. Cl.
*H04N 7/18* (2006.01)
*B60R 16/02* (2006.01)
(Continued)

(52) U.S. Cl.
CPC ................ *B60R 16/02* (2013.01); *B60K 35/00* (2013.01); *G06F 3/013* (2013.01); *G06K 9/00791* (2013.01); *G06K 9/00832* (2013.01);
(Continued)

(58) Field of Classification Search
CPC ......... H04N 7/18; H04N 7/181; H04N 7/183; H04N 7/188; H04N 5/2252; H04N 5/23238; H04N 5/247; H04N 5/265; B60R 1/00; B60R 11/00; B60R 2011/0001; B60R 2011/0042; B60R 11/04; B60R 2001/1253; B60R 2011/005
USPC ............................................. 348/148, 77, 78
IPC ................................................ H04N 7/18, 9/47
See application file for complete search history.

(56) References Cited

U.S. PATENT DOCUMENTS

2002/0140562 A1* 10/2002 Gutta et al. ................... 340/576
2007/0124027 A1   5/2007 Betzitza et al.
(Continued)

FOREIGN PATENT DOCUMENTS

DE  10325123 A1  12/2004
DE  10343683 A1   4/2005
(Continued)

OTHER PUBLICATIONS

Japanese Notice of Allowance dated Jul. 16, 2013, Application No. 2011-195686, with partial English translation, 4 pages.
(Continued)

*Primary Examiner* — Trang U Tran
(74) *Attorney, Agent, or Firm* — Rankin, Hill & Clark LLP

(57) ABSTRACT

If an iris or a pupil is detected as being positioned in a right area, a vehicle-mounted device identifier of a vehicle-mounted device identifying apparatus identifies a vehicle-mounted device group, which is disposed in an area that is on the right side of an area that is identified based on a facial direction detected by a facial direction detector. If the iris or the pupil is detected as being positioned in a left area, the vehicle-mounted device identifier identifies a vehicle-mounted device group, which is disposed in an area that is on the left side of an area that is identified based on the facial direction. If the iris or the pupil is detected as being positioned in a central area, the vehicle-mounted device identifier identifies a vehicle-mounted device group, which is disposed in an area that is identified based on the facial direction.

7 Claims, 55 Drawing Sheets

(51) Int. Cl.
    *B60K 35/00* (2006.01)
    *G06F 3/01* (2006.01)
    *G06K 9/00* (2006.01)
    *B60K 37/06* (2006.01)

(52) U.S. Cl.
    CPC ......... *B60K37/06* (2013.01); *B60K 2350/1004* (2013.01); *B60K 2350/1096* (2013.01); *B60K 2350/962* (2013.01); *B60K 2350/965* (2013.01); *B60K 2350/2013* (2013.01); *B60W 2420/42* (2013.01)
    USPC ............................................ 348/148; 348/78

(56) References Cited

U.S. PATENT DOCUMENTS

| | | | |
|---|---|---|---|
| 2009/0115846 A1* | 5/2009 | Ohue et al. | 348/148 |
| 2009/0251534 A1* | 10/2009 | Fujimoto et al. | 348/78 |
| 2009/0268025 A1* | 10/2009 | Hiramaki et al. | 348/148 |
| 2010/0238280 A1 | 9/2010 | Ishii | |

FOREIGN PATENT DOCUMENTS

| | | |
|---|---|---|
| EP | 2000889 A2 | 12/2008 |
| JP | 08-058302 | 3/1996 |
| JP | 2007-230369 | 9/2007 |
| JP | 2008-081053 | 4/2008 |
| JP | 2009-227246 | 10/2009 |
| JP | 2010-076602 | 4/2010 |
| JP | 2010-105417 | 5/2010 |

OTHER PUBLICATIONS

R.I. Hammoud, "Passive Eye Monitoring", Jan. 1, 2008; Springer, XP002698040, ISBN: 978-3-540-75411-4, pp. 2-7, 23-53, p. 6, p. 25-27; 38 pages.

Extended European Search Report, Application No. 12183515.1, dated Jun. 14, 2013, 6 pages.

* cited by examiner

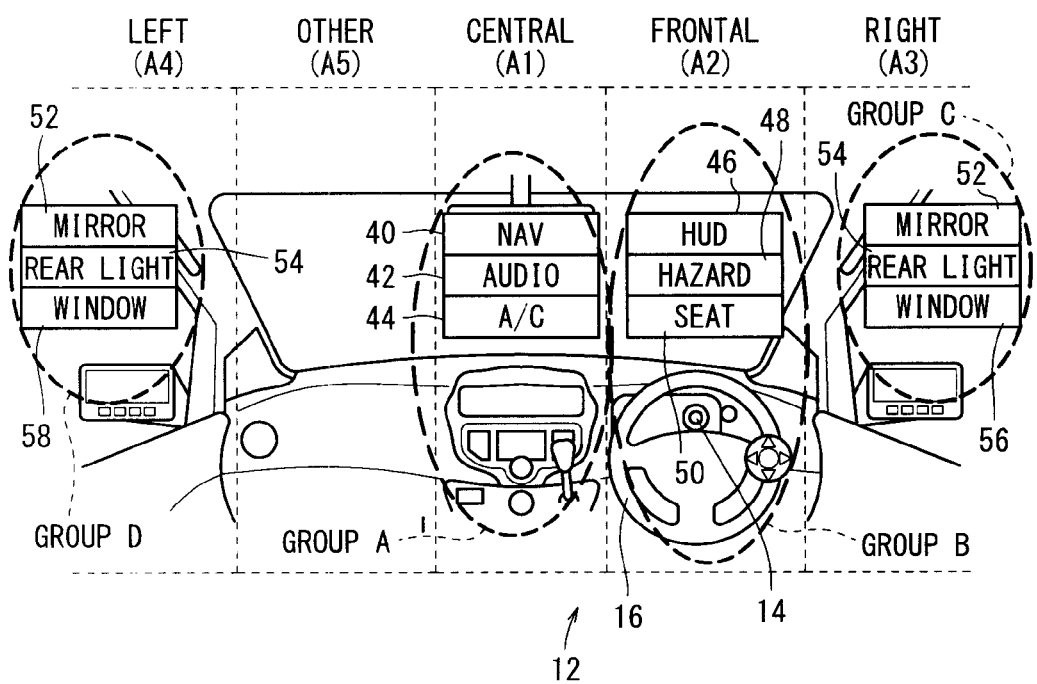

FIG. 9

CENTRAL

NAV:
(1) WHILE FACING IN CENTRAL DIRECTION, PRESS UPPER BUTTON 32
(2) INCREASE SCALE WITH UPPER BUTTON 32, REDUCE SCALE WITH LOWER BUTTON 34, SWITCH MAP DIRECTION WITH LEFT BUTTON 36 AND RIGHT BUTTON 38 (NORTHWARD DIRECTION ⇔ TRAVELING DIRECTION)

AUDIO:
(1) WHILE FACING IN CENTRAL DIRECTION, PRESS CENTRAL BUTTON 30
(2) ADJUST VOLUME WITH UPPER BUTTON 32 AND LOWER BUTTON 34, SELECT MUSIC OR STATION WITH LEFT AND RIGHT BUTTONS 36, 38 (CD OR RADIO OR ANYTHING BEING ACTIVATED)

A/C:
(1) WHILE FACING IN CENTRAL DIRECTION, PRESS LOWER BUTTON 34
(2) ADJUST TEMPERATURE WITH UPPER BUTTON 32 AND LOWER BUTTON 34, ADJUST AIR VOLUME SETTING WITH LEFT AND RIGHT BUTTONS 36, 38

FRONTAL

HUD:
(1) WHILE FACING IN CENTRAL DIRECTION, PRESS UPPER BUTTON 32 (HUD IS ACTIVATED)
(2) SUCCESSIVELY DISPLAY SPEED, DISTANCE, MILEAGE, AMOUNT OF GASOLINE, ETC., WITH UPPER BUTTON 32 AND LOWER BUTTON 34

HAZARD:
(1) WHILE FACING IN CENTRAL DIRECTION, PRESS CENTRAL BUTTON 30 (HAZARD LAMP BLINKED)

SEAT:
(1) WHILE FACING IN CENTRAL DIRECTION, PRESS LOWER BUTTON 34 (SEAT SLIDING AND RECLINING FUNCTION MADE READY)
(2) SLIDE FORWARDLY AND REARWARDLY WITH UPPER BUTTON 32 AND LOWER BUTTON 34, ADJUST RECLINING ANGLE WITH LEFT AND RIGHT BUTTONS 36, 38

LEFT AND RIGHT

DOOR MIRROR:
(1) WHILE FACING IN RIGHTWARD (LEFTWARD) DIRECTION, PRESS LEFT BUTTON 36 (RIGHT BUTTON 38) TO FOLD MIRROR, PRESS RIGHT BUTTON 38 (LEFT BUTTON 36) TO UNFOLD MIRROR

REAR LIGHT:
(1) WHILE FACING IN RIGHTWARD (LEFTWARD) DIRECTION, PRESS CENTRAL BUTTON 30 TO ENERGIZE REAR LIGHT

POWER WINDOW:
(1) WHILE FACING IN RIGHTWARD (LEFTWARD) DIRECTION, PRESS UPPER BUTTON 32 OR LOWER BUTTON 34 (TO OPEN OR CLOSE WINDOW)

END WITH CENTRAL BUTTON 30 (EXCEPT MIRROR)

FIG. 10

| BUTTON OPERATED FOR SELECTING DEVICE | OPERATION TARGET DEVICE | FUNCTION PERFORMED WHEN DEVICE IS SELECTED | ASSIGNMENT AFTER DEVICE IS SELECTED | | |
|---|---|---|---|---|---|
| | | | ● | ◆ | ✦ |
| ✦ | NAV | — | END | SCALE ADJUSTMENT | MAP DIRECTION SWITCHING |
| ● | AUDIO | — | END | VOLUME ADJUSTMENT | MUSIC SELECTION (STATION SELECTION) |
| ✦ | A/C | — | END | TEMPERATURE ADJUSTMENT | AIR VOLUME SETTING ADJUSTMENT |
| ✦ | HUD | HUD ACTIVATION | END | DISPLAY INFORMATION (SPEED, DISTANCE, MILEAGE, ETC.) SWITCHING | — |
| ● | HAZARD | HAZARD BLINKING | HAZARD DE-ENERGIZATION (END) | — | — |
| ✦ | SEAT | — | END | FORWARD AND REARWARD SLIDING | RECLINING ANGLE ADJUSTMENT |
| ✦ / ✦ | DOOR MIRROR | WHEN FACING TO LEFT (RIGHT), LEFT BUTTON: MIRROR UNFOLDING (FOLDING), RIGHT BUTTON: MIRROR FOLDING (UNFOLDING) * AUTOMATICALLY ENDED AFTER OPERATION | — | — | — |
| ● | REAR LIGHT | LIGHT ENERGIZATION | LIGHT DE-ENERGIZATION (END) | — | — |
| ✦ | WINDOW | OPENING AND CLOSING | END | OPENING AND CLOSING | — |

THERE IS NO DEVIATION
(FACIAL DIRECTION Y ≒ VIEWING DIRECTION X)

THERE IS A DEVIATION
(FACIAL DIRECTION Y ≠ VIEWING DIRECTION X)

SHIFTED TO RIGHT

AT CENTER

SHIFTED TO LEFT

CENTER/CENTER OF GRAVITY OF IRIS/PUPIL: IN LEFT AREA

AREA WHERE IRIS/PUPIL HAS MAXIMUM AREA: LEFT AREA

CENTER/CENTER OF GRAVITY OF IRIS/PUPIL: IN CENTRAL AREA

AREA WHERE IRIS/PUPIL HAS MAXIMUM AREA: CENTRAL AREA

CENTER/CENTER OF GRAVITY OF IRIS/PUPIL: IN LEFT AREA

AREA WHERE IRIS/PUPIL HAS MAXIMUM AREA: LEFT AREA

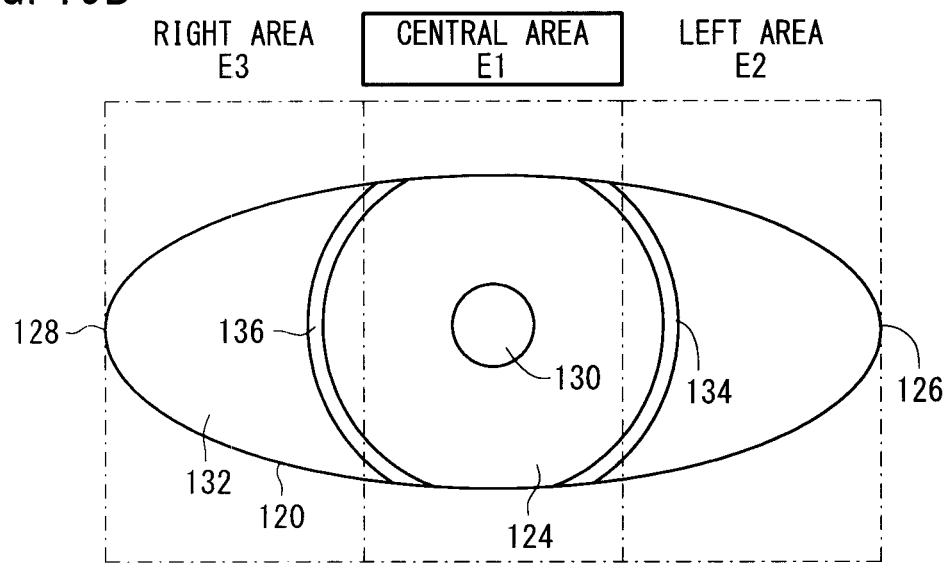

CENTER OF LEFT AND RIGHT EDGES: IN RIGHT AREA

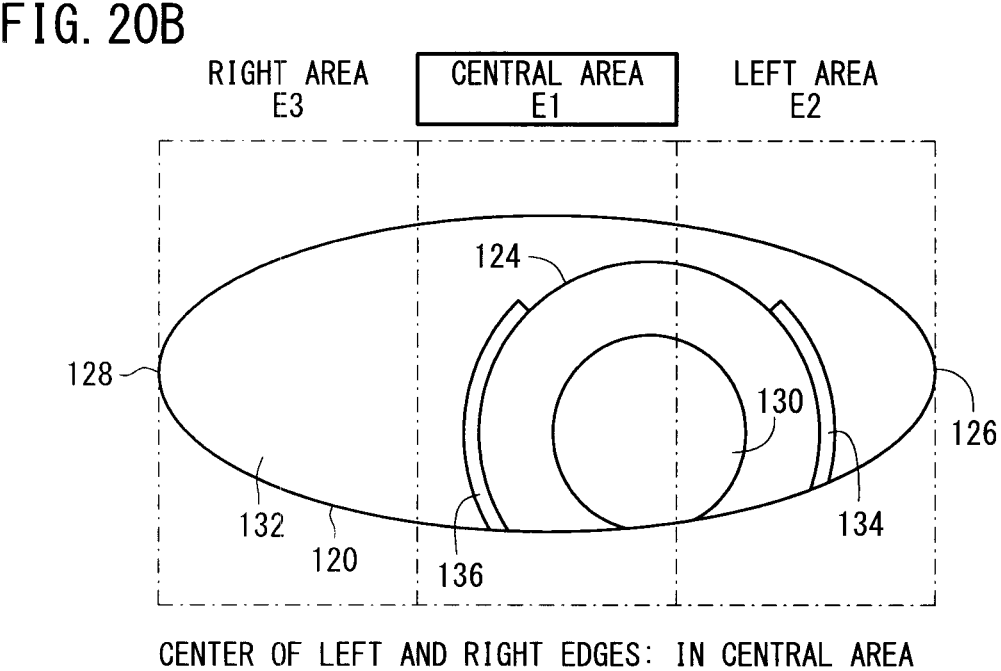

FIG. 21

| VIEWING AREA JUDGMENT | | FACIAL DIRECTION | | | | |
|---|---|---|---|---|---|---|
| | | LEFT (A4) | OTHER (A5) | CENTRAL (A1) | FRONTAL (A2) | RIGHT (A3) |
| EYEBALL DIRECTION | SHIFTED TO LEFT | LEFT (A4) | LEFT (A4) | OTHER (A5) | CENTRAL (A1) | RIGHT (A3) |
| | AT CENTER | LEFT (A4) | OTHER (A5) | CENTRAL (A1) | FRONTAL (A2) | RIGHT (A3) |
| | SHIFTED TO RIGHT | LEFT (A4) | OTHER (A5) | CENTRAL (A1) | RIGHT (A3) | RIGHT (A3) |

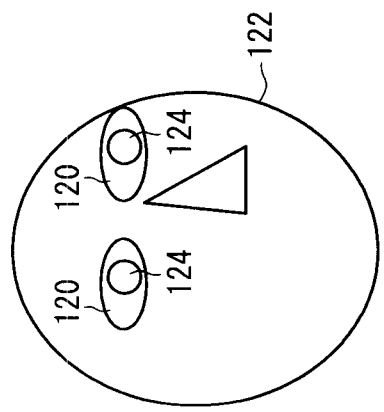

FACIAL DIRECTION: CENTRAL (A1)
EYEBALL DIRECTION: SHIFTED TO LEFT } → VIEWING DIRECTION: OTHER (A5)

FACIAL DIRECTION: CENTRAL (A1)
EYEBALL DIRECTION: SHIFTED TO RIGHT } → VIEWING DIRECTION: CENTRAL (A1)

VEHICLE-MOUNTED DEVICE IDENTIFYING APPARATUS

CROSS-REFERENCE TO RELATED APPLICATION

This application is based upon and claims the benefit of priority from Japanese Patent Application No. 2011-195686 filed on Sep. 8, 2011, of which the contents are incorporated herein by reference.

BACKGROUND OF THE INVENTION

1. Field of the Invention

The present invention relates to a vehicle-mounted device identifying apparatus for identifying a plurality of vehicle-mounted devices based on the viewing direction of a vehicle driver.

2. Description of the Related Art

According to Japanese Laid-Open Patent Publication No. 2010-105417 (hereinafter referred to as "JP2010-105417A"), the direction and size of the pupil of the driver of a vehicle is detected, and a vehicle-mounted device 21, which is seen by the driver, is selected as a control target and made operable by an operation input means 28 on the steering wheel 50 (see Summary section of JP2010-105417A). Concerning detection of the direction of the pupil, according to JP2010-105417A, the eyeball is irradiated with infrared radiation, and the position of the pupil and the reflected position of the cornea are detected from image data representative of the eyeball image. Based on the detected positions, pupil direction data representative of a line of sight (i.e., the direction of the pupil) are obtained (see paragraph [0016]). With respect to detection of the size of the pupil, according to JP2010-105417A, the size of the pupil is determined based on feature points extracted from the image data of the eyeball (see paragraph [0016]).

SUMMARY OF THE INVENTION

According to JP2010-105417A, as described above, the vehicle-mounted device 21 is selected as a control target based on the direction and size of the pupil of the driver. However, since the pupil is relatively small, involved errors tend to become so large that the vehicle-mounted device 21, which is intended to be selected, is likely to be judged erroneously. If a high-performance camera is employed to achieve an appropriate level of detection accuracy, or if a processor for carrying out sophisticated image processing sequences is employed, then equipment costs are increased.

The present invention has been made in view of the above problems. It is an object of the present invention to provide a vehicle-mounted device identifying apparatus, which is capable of performing at least one of a task of preventing a vehicle-mounted device from being erroneously judged as a control target, and a task of reducing cost.

A vehicle-mounted device identifying apparatus according to the present invention includes a plurality of vehicle-mounted devices mounted on a vehicle, an image capturing unit mounted on the vehicle for capturing an image including a passenger in the vehicle, a facial direction detecting unit for detecting a direction of a face (hereinafter referred to as a "facial direction") of the passenger in a widthwise direction of the vehicle based on the image captured by the image capturing unit, an eyeball direction detecting unit for detecting a direction of an eyeball (hereinafter referred to as an "eyeball direction") of the passenger in the widthwise direction of the vehicle based on the image captured by the image capturing unit, and a vehicle-mounted device identifying unit for identifying one of the vehicle-mounted devices based on the facial direction detected by the facial direction detecting unit. The vehicle-mounted devices are arranged along the widthwise direction and are divided into a plurality of vehicle-mounted device groups assigned to respective areas along the widthwise direction, the eyeball direction detecting unit recognizes an outer corner and an inner corner, and an iris or a pupil of the eye of the passenger from the image, divides the eye into a right area, a left area, and a central area between the outer corner and the inner corner, and detects whether the iris or the pupil is positioned in the right area, the left area, or the central area, the vehicle-mounted device identifying unit identifies one of the vehicle-mounted devices, which is disposed in one of the areas that is on the right side of one of the areas that is identified based on the facial direction detected by the facial direction detecting unit, if the eyeball direction detecting unit detects that the iris or the pupil is positioned in the right area, the vehicle-mounted device identifying unit identifies one of the vehicle-mounted devices, which is disposed in one of the areas that is on the left side of one of the areas that is identified based on the facial direction detected by the facial direction detecting unit, if the eyeball direction detecting unit detects that the iris or the pupil is positioned in the left area, and the vehicle-mounted device identifying unit identifies one of the vehicle-mounted devices, which is disposed in one of the areas that is identified based on the facial direction detected by the facial direction detecting unit, if the eyeball direction detecting unit detects that the iris or the pupil is positioned in the central area.

According to the present invention, a vehicle-mounted device or a vehicle-mounted device group along the widthwise direction is identified based on the facial direction and the eyeball direction of the passenger. Therefore, it is possible to achieve at least one of increased accuracy in detecting an operation target, prevention of erroneous judgments, and reduction in cost.

For example, since the eyeball direction is used, detection accuracy is made higher than if an operation target were identified only from the facial direction. Since an image of the face, which is greater in size than the iris or the pupil, is used, the direction can be identified easily. Further, detection accuracy is made higher or the processing sequence is made simpler than if an operation target were identified only from the direction of the iris or the pupil. Inasmuch as detection of the eyeball direction is used together with detection of the facial direction, detection accuracy can be made lower than if only detection of the eyeball direction were used. In view of this fact, it also is possible to simplify the processing sequence.

The vehicle-mounted device identifying unit may identify one of the vehicle-mounted devices, which is disposed in one of the areas that is identified based on the facial direction detected by the facial direction detecting unit, if the iris or the pupil is positioned in the right area and the face is directed to the left from a frontal direction, and if the iris or the pupil is positioned in the left area and the face is directed to the right from the frontal direction. When the facial direction and the eyeball direction are opposite to each other, it is considered that the passenger is attempting to see a certain vehicle-mounted device. Consequently, it is possible to prevent erroneous operations from occurring due to identifying a vehicle-mounted device as an operation target when the operation target does not need to be identified.

The vehicle-mounted device identifying unit may identify one of the vehicle-mounted devices, which is disposed in one of the areas that is identified based on the facial direction detected by the facial direction detecting unit, if the image capturing unit does not detect the eyeball. Since a vehicle-mounted device as an operation target can be identified based only on the facial direction when the eyeball is not detected, it is possible to eliminate instances in which the vehicle-mounted device operating apparatus cannot be used.

The facial direction detecting unit may detect the facial direction when the facial direction remains unchanged for a first prescribed time, and the eyeball direction detecting unit may detect the eyeball direction when the iris or the pupil is positioned in one area for a second prescribed time, wherein the first prescribed time is shorter than the second prescribed time. Generally, it is easier to change the eyeball direction than to change the facial direction. Thus, while the passenger drives the vehicle, the eyeball direction is likely to change relatively frequently, because the passenger needs to acquire various items of information concerning other vehicles, pedestrians, and traffic signals. According to the present invention, the time required to detect (identify) the eyeball direction is longer than the time required to detect (identify) the facial direction. Therefore, it is easier to prevent a vehicle-mounted device from being identified in error due to short-term movements of the eyeball, which are not intended to identify an operation target device.

Alternatively, the first prescribed time may be longer than the second prescribed time. If the time required to detect (identify) the eyeball direction is made shorter, then the eyeball direction may be changed in a relatively short period of time when determining a vehicle-mounted device as an operation target. It is thus possible to increase the freedom of movement of the eyeball, which can be used for reasons other than to identify an operation target.

A vehicle-mounted device identifying apparatus according to the present invention includes a plurality of vehicle-mounted devices arranged along a widthwise direction of a vehicle, an image capturing unit mounted on the vehicle for capturing an image including a passenger in the vehicle, a facial direction detector for detecting a direction of a face (hereinafter referred to as a "facial direction") of the passenger in a widthwise direction of the vehicle based on the image, an eyeball direction detector for detecting a direction of an eyeball (hereinafter referred to as an "eyeball direction") of the passenger with respect to the face of the passenger in the widthwise direction of the vehicle based on the image, and a vehicle-mounted device identifier for identifying an operation target from the vehicle-mounted devices based on the facial direction and the eyeball direction. The vehicle-mounted device identifier identifies the operation target from one or more of the vehicle-mounted devices, which are on the right side of one of the vehicle-mounted devices that is positioned in the facial direction, if the eyeball direction is rightward of a first position that is on the right side of a frontal direction of the face of the passenger as viewed from an observer of the face, the vehicle-mounted device identifier identifies the operation target from one or more of the vehicle-mounted devices, which are on the left side of one of the vehicle-mounted devices that is positioned in the facial direction, if the eyeball direction is leftward of a second position that is on the left side of the frontal direction of the face of the passenger as viewed from the observer of the face, and the vehicle-mounted device identifier identifies the operation target from one or more of the vehicle-mounted devices, which are positioned in the facial direction, if the eyeball direction lies between the first position and the second position as viewed from the observer of the face.

According to the present invention, a vehicle-mounted device or a vehicle-mounted device group along the widthwise direction is identified based on the facial direction and the eyeball direction of the passenger. Therefore, it is possible to achieve at least one of increased accuracy in detecting an operation target, prevention of erroneous judgments, and reduction in cost.

For example, since the eyeball direction is used, detection accuracy is higher than if an operation target were identified only from the facial direction. Since an image of the face, which is greater in size than the pupil, is used, the direction can be identified easily and detection accuracy is increased, or the processing sequence is made simpler than if an operation target were identified only from the direction of the pupil. Inasmuch as detection of the eyeball direction is used together with detection of the facial direction, detection accuracy can be made lower than if only detection of the eyeball direction (pupil position) were used. In view of this fact, the processing sequence can be simplified.

The vehicle-mounted device identifier may identify the operation target from one or more of the vehicle-mounted devices, which are positioned in the facial direction, if the eyeball direction is rightward of the first position as viewed from the observer of the face and the face is directed to the left from the frontal direction, or if the eyeball direction is leftward of the second position as viewed from the observer of the face and the face is directed to the right from the frontal direction. When the facial direction and the eyeball direction are opposite to each other, it is considered that the passenger is attempting to see a certain vehicle-mounted device. Consequently, it is possible to prevent erroneous operations from occurring due to identifying a vehicle-mounted device as an operation target when the operation target does not need to be identified.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a view showing a front windshield area, which is divided into five areas;

FIG. 9 is a diagram showing a list of processes of selecting and operating vehicle-mounted devices;

FIG. 10 is a diagram showing a list of buttons allocated to vehicle-mounted devices;

FIG. 19B is a second view illustrative of a process of judging an area to which an iris or a pupil belongs, by comparing vertical edges (left and right edges) of the iris or the pupil and areas;

FIG. 20B is a fourth view illustrative of a process of judging an area to which an iris or a pupil belongs, by comparing vertical edges (left and right edges) of the iris or the pupil and areas;

FIG. 21 is a table showing a relationship between combinations of the facial direction, the eyeball direction, and the viewing direction;

FIG. 22A is a view showing a first specific example, which is illustrative of the relationship shown in FIG. 21;

DESCRIPTION OF THE PREFERRED EMBODIMENTS

1. Description of Overall Arrangement 1-1. Overall Arrangement

Figure 1:
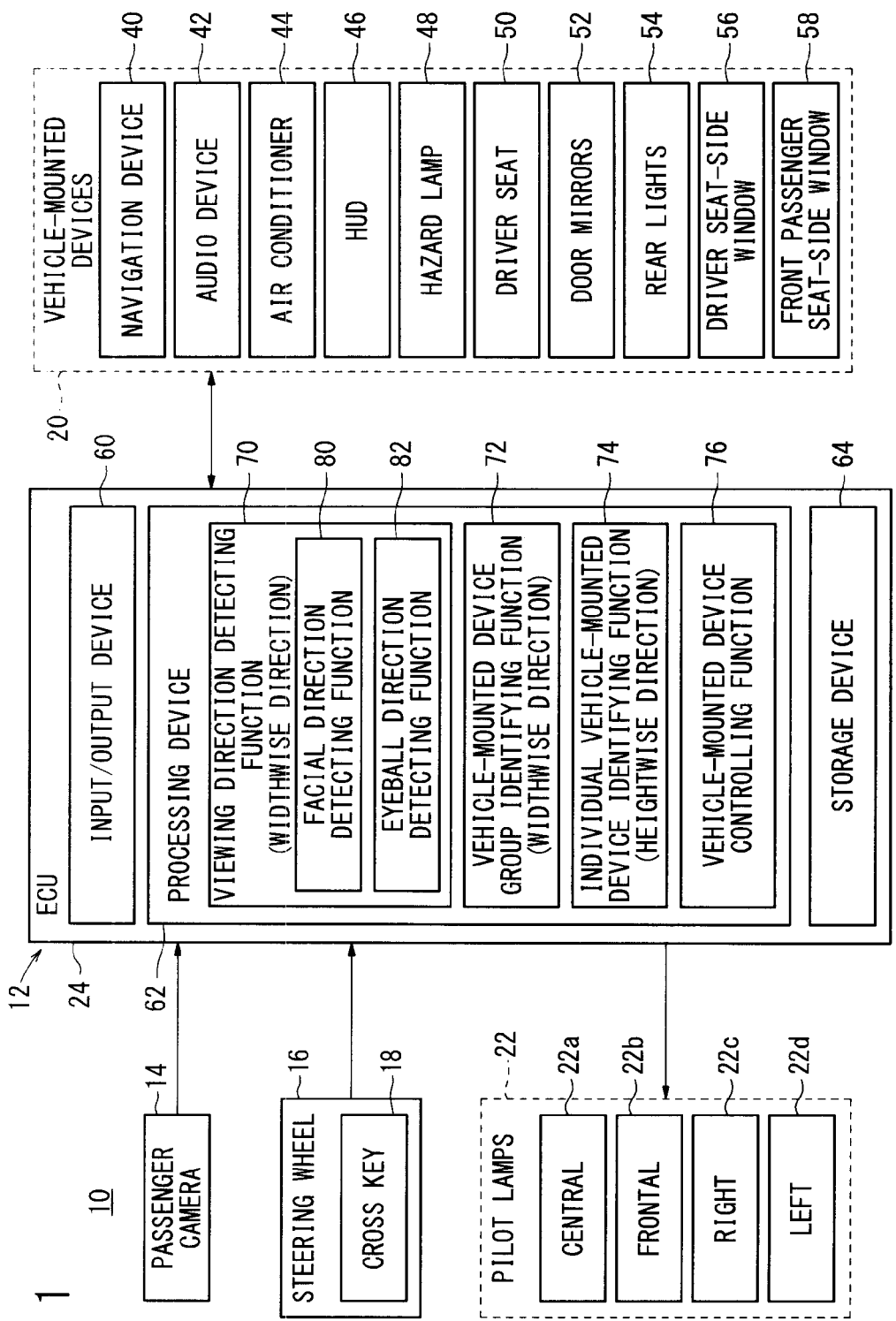
FIG. 1 is an overall block diagram of a vehicle incorporating therein a vehicle-mounted device operating apparatus as a vehicle-mounted device identifying apparatus according to an embodiment of the present invention.
Figure 2:
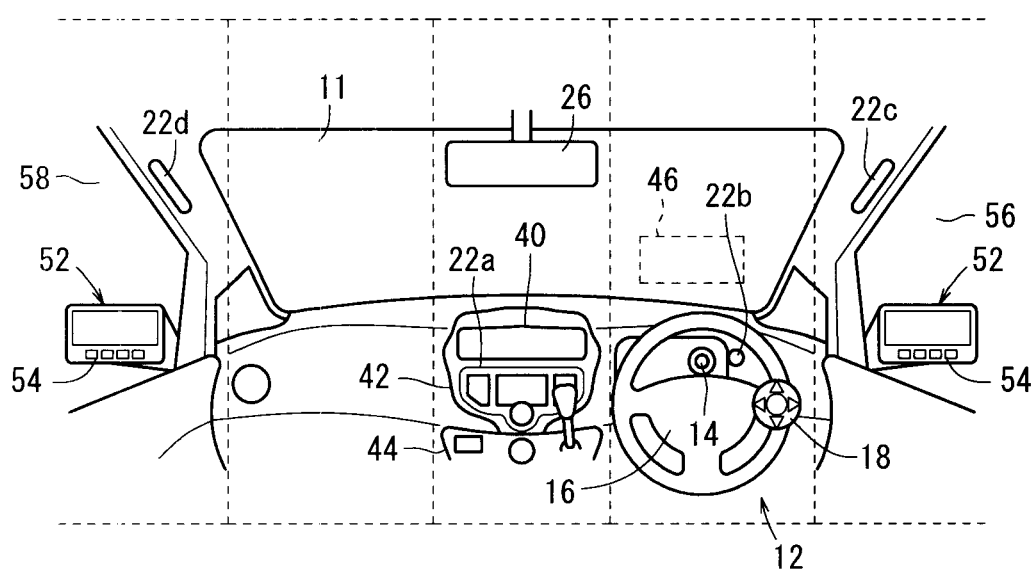
FIG. 2 is a view of a front windshield area of the vehicle.

FIG. 1 is an overall block diagram of a vehicle 10 incorporating therein a vehicle-mounted device operating apparatus 12 (hereinafter also referred to as an "operating apparatus 12") as a vehicle-mounted device identifying apparatus according to an embodiment of the present invention. FIG. 2 is a view of a front windshield 11 area of the vehicle 10. As shown in FIGS. 1 and 2, the operating apparatus 12 includes a passenger camera 14, a cross key 18 mounted on a steering wheel 16, a plurality of pilot lamps 22a through 22d (hereinafter collectively referred to as "pilot lamps 22"), and an electronic control unit 24 (hereinafter referred to as an "ECU 24"). As shown in FIG. 2, the vehicle 10 according to the present embodiment is a right steering wheel vehicle. However, a left steering wheel vehicle may also incorporate the same details as those of the present embodiment.

1-2. Passenger Camera 14

As shown in FIG. 2, the passenger camera 14 (image capturing unit) is mounted on a steering column (not shown) in front of the driver, and captures an image of the face of the driver (hereinafter referred to as a "facial image"). The location of the passenger camera 14 is not limited to the above position, but may be installed near a rearview mirror 26, for example. The passenger camera 14 is not limited to a camera for capturing an image from a single direction, but may be a camera for capturing images from a plurality of directions (a so-called "stereo camera").

1-3. Cross Key 18

Figure 3:
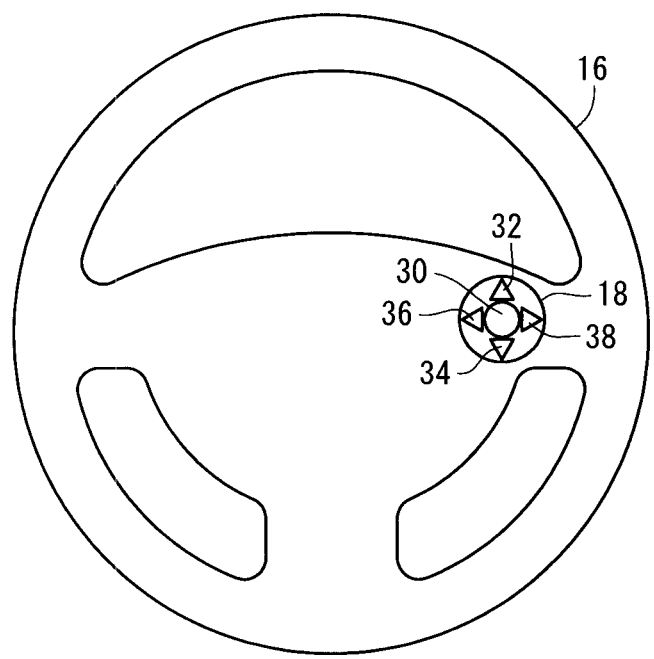
FIG. 3 is a front elevational view of a steering wheel of the vehicle.

The driver can identify a vehicle-mounted device 20 to be operated (hereinafter referred to as an "operation target device") and enter operational inputs for the identified vehicle-mounted device 20 using the cross key 18. As shown in FIG. 3, the cross key 18 has a central button 30, an upper button 32, a lower button 34, a left button 36, and a right button 38. In FIG. 2, the cross key 18 is shown in an enlarged scale. A process of operating the cross key 18 will be described later.

1-4. Plural Vehicle-Mounted Devices 20

According to the present embodiment, the vehicle-mounted devices 20 (FIG. 1) include a navigation device 40, an audio device 42, an air conditioner 44, a head-up display 46 (hereinafter referred to as a "HUD 46"), a hazard lamp 48, a driver seat 50, door mirrors 52, rear lights 54, a driver seat-side window 56, and a front passenger seat-side window 58.

Figure 4:
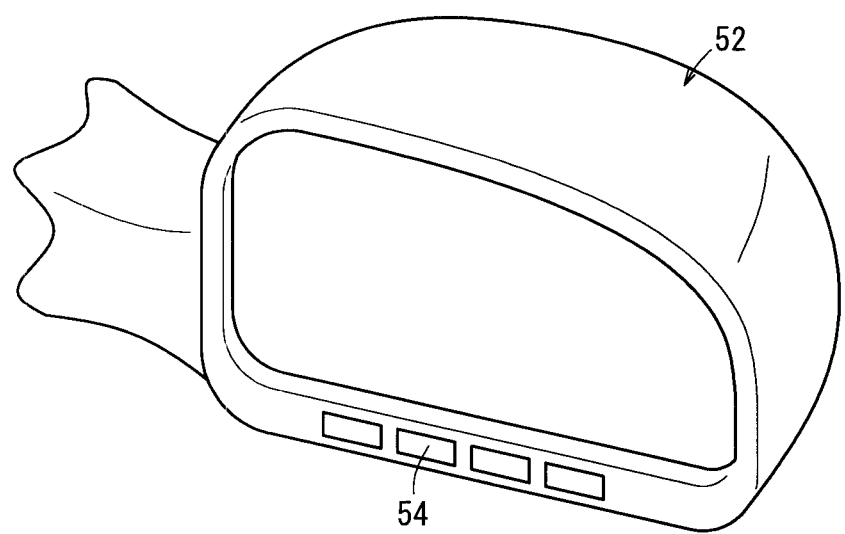
FIG. 4 is a perspective view of a rear light of the vehicle.

As shown in FIG. 4, the rear lights 54 illuminate side rear regions of the vehicle 10 with light-emitting diodes (LEDs) below the door mirrors 52.

1-5. Pilot Lamps 22a through 22d

According to the present embodiment, four pilot lamps 22a through 22d are provided. The pilot lamps 22a through 22d include a central pilot lamp 22a, a front pilot lamp 22b, a right pilot lamp 22c, and a left pilot lamp 22d. The pilot lamps 22a through 22d indicate which one of a plurality of vehicle-mounted device groups A through D (hereinafter also referred to as "groups A through D") is selected.

1-6. ECU 24

The ECU 24 controls the vehicle-mounted device operating apparatus 12 (in particular, each of the vehicle-mounted devices 20 according to the present embodiment). As shown in FIG. 1, the ECU 24 has an input/output device 60, a processing device 62, and a storage device 64. The processing device 62 includes a viewing direction detecting function 70, a vehicle-mounted device group identifying function 72, an individual vehicle-mounted device identifying function 74, and a vehicle-mounted device controlling function 76.

According to the present embodiment, it is possible to control each of the vehicle-mounted devices 20 simply by using the functions 70, 72, 74 and 76. More specifically, the driver can control a vehicle-mounted device 20 (operation target device) by directing the driver's line of sight or the driver's face along a vehicular widthwise direction where the operation target device is present, and then operating the cross key 18. As described later, the driver can also identify and control an operation target device according to various other processes.

The viewing direction detecting function 70 is a function for detecting the viewing direction of the driver based on the facial direction of the driver (passenger) and the direction of the line of sight (eyeball direction) of the driver. The viewing direction detecting function 70 includes a facial direction detecting function 80 (facial direction detecting unit or facial direction detector) for detecting the facial direction of the driver, and an eyeball direction detecting function 82 (eyeball direction detecting unit or eyeball direction detector) for detecting the direction of the line of sight (eyeball direction) of the driver.

The vehicle-mounted device group identifying function 72 is a function to detect the viewing direction of the driver based on the facial direction and the direction of the line of sight of the driver (eyeball direction or relative position), and to identify a vehicle-mounted device group (groups A through D) that is present in the detected viewing direction. The individual vehicle-mounted device identifying function 74 is a function to identify an operation target device, depending on an operation made by the driver, from among a plurality of vehicle-mounted devices 20 included in the vehicle-mounted device group that is identified by the vehicle-mounted device group identifying function 72. The vehicle-mounted device controlling function 76 is a function to control the operation target device identified by the individual vehicle-mounted device identifying function 74, depending on an operation input entered by the driver. The viewing direction detecting function 70 and the vehicle-mounted device group identifying function 72 function together as a vehicle-mounted device identifying unit or vehicle-mounted device identifier.

2. Outline of Control Process According to the Present Embodiment

According to the present embodiment, as described above, the driver directs the driver's line of sight or the driver's face along a vehicular widthwise direction where an operation target device is present, and then operates the cross key 18 to thereby control the operation target device.

To perform the above control process, according to the present embodiment, a facial direction and an eyeball direction (relative position of the eyeball) are detected based on a facial image of the driver, which is captured by the passenger camera 14. A viewing direction along the vehicular widthwise direction is identified based on the detected facial direction and the detected eyeball direction. Thereafter, a heightwise direction (vertical direction) is identified based on an operation made on the cross key 18. In this manner, an operation target device is identified.

According to the present embodiment, five viewing directions are established along the widthwise direction, as shown in FIG. 5. More specifically, the front windshield 11 area is divided into five areas A1 through A5. The five areas A1 through A5 include an area A1 in a central direction, an area A2 in a frontal direction, an area A3 in a rightward direction, an area A4 in a leftward direction, and an area A5 in another direction. The vehicle-mounted devices 20 are assigned to the respective directions (groups A through D).

The navigation device 40, the audio device 42, and the air conditioner 44 (group A) are assigned to the area A1 in the central direction. In FIG. 5 and the other figures, "NAV" refers to a navigation device, "AUDIO" refers to an audio device, and "A/C" refers to an air conditioner.

The HUD 46, the hazard lamp 48, and the seat 50 (group B) are assigned to the area A2 in the frontal direction. In FIG. 5 and the other figures, "HAZARD" refers to a hazard lamp. One of the door mirrors 52, one of the rear lights 54, and the driver seat-side window 56 (group C) are assigned to the area A3 in the rightward direction. The other door mirror 52, the other rear light 54, and the front passenger seat-side window 58 (group D) are assigned to the area A4 in the leftward direction. No vehicle-mounted device 20 is assigned to the area A5 in the other direction. According to the present embodiment, the left and right door mirrors 52 are simultaneously unfolded and folded, and the left and right rear lights 54 are simultaneously operated.

The ECU 24 (viewing direction detecting function 70) detects a facial direction and an eyeball direction (relative position of the eyeball) based on the facial image from the passenger camera 14, and judges a viewing direction of the driver using the detected facial direction and the detected eyeball direction. Then, the ECU 24 (vehicle-mounted device group identifying function 72) identifies a vehicle-mounted device group (groups A through D) based on the judged viewing direction. Then, the ECU 24 identifies an operation target device depending on a pressed button (any one of the buttons 30, 32, 34, 36, or 38) of the cross key 18. Thereafter, the ECU 24 operates the operation target device depending on how the cross key 18 is operated.

3. Processes of Selecting Operation Target Devices and Operational Examples in the Present Embodiment

3-1. Changing the Volume of the Audio Device 42

Figure 6A:
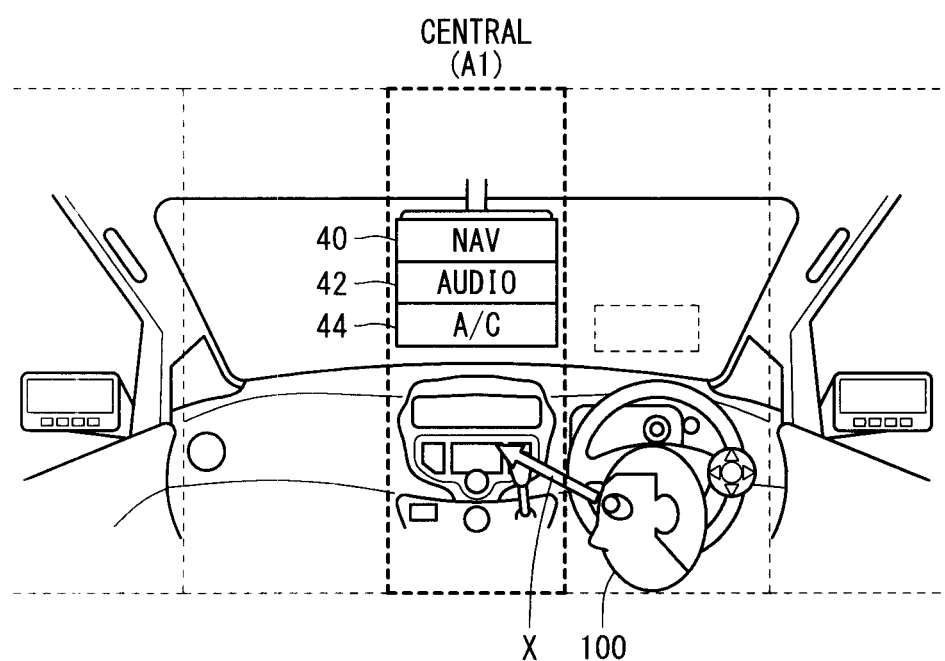
FIG. 6A is a view showing a first example of operations performed by the driver for changing the volume of an audio device.
Figure 6B:
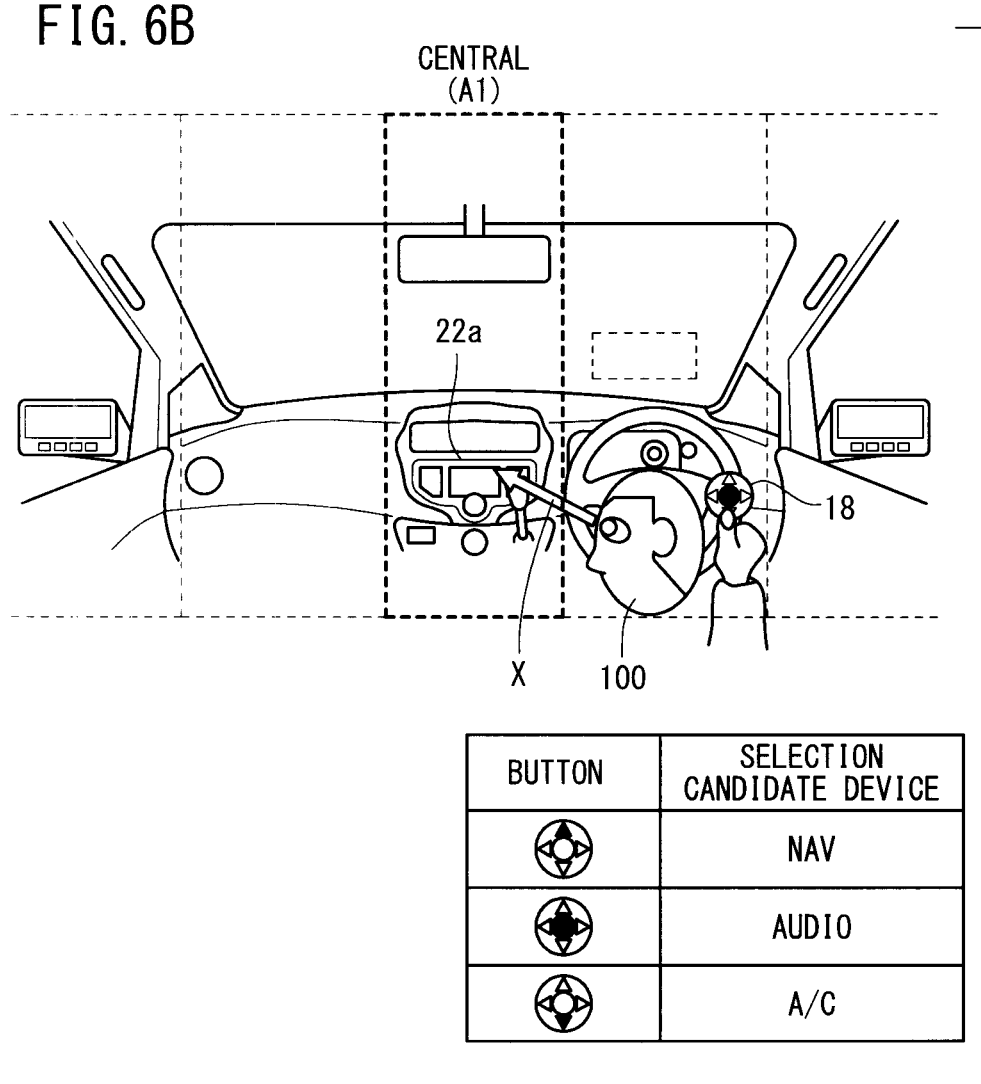
FIG. 6B is a view showing a second example of operations performed by the driver for changing the volume of the audio device.
Figure 6C:
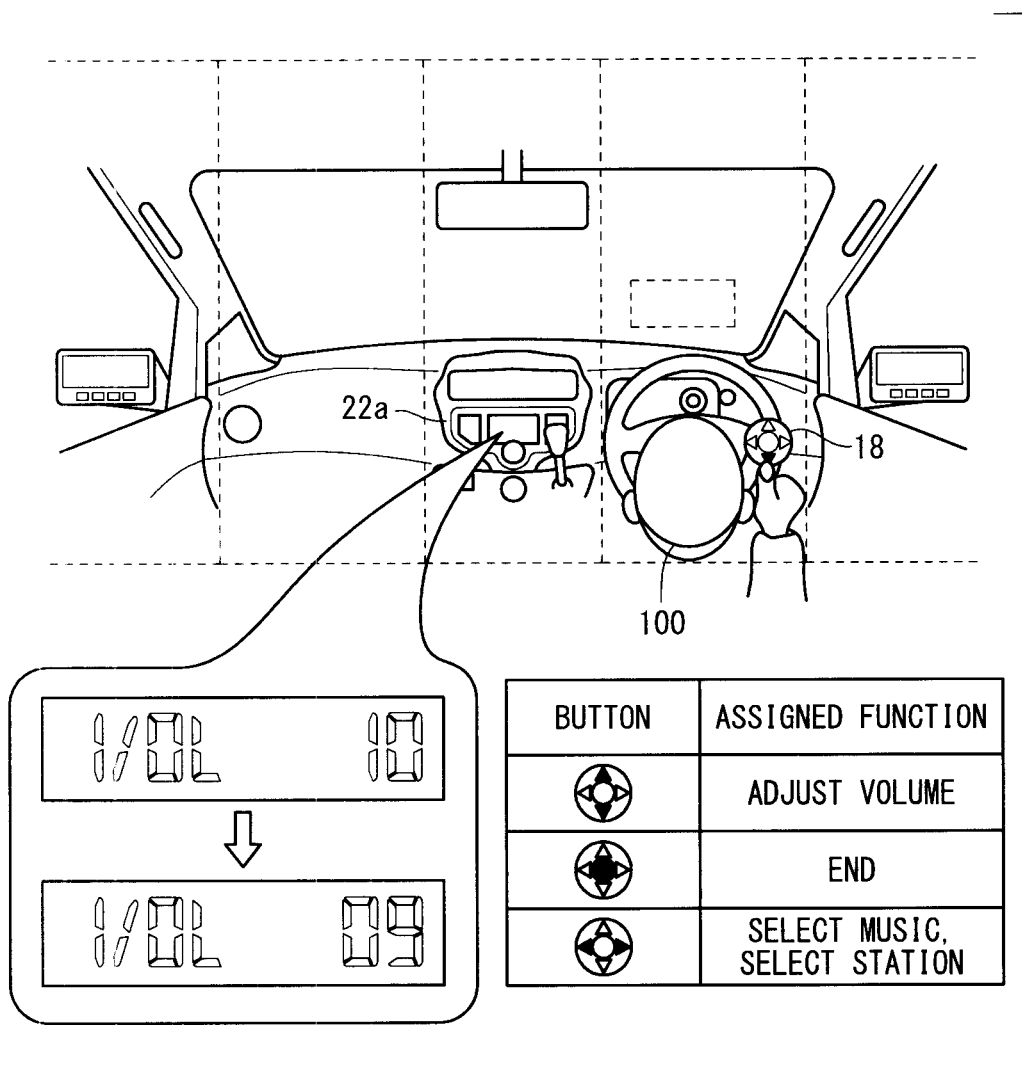
FIG. 6C is a view showing a third example of operations performed by the driver for changing the volume of the audio device.

FIGS. 6A through 6C show first through third examples of operations performed by a driver 100 for changing the volume of the audio device 42. As shown in FIG. 6A, the driver 100 sees or turns the driver's face to the area A1 (central direction) where the audio device 42 is present, from among all of the five areas A1 through A5. The ECU 24 then identifies the vehicle-mounted device group (group A) using a viewing direction judging technology to be described later. The arrow X in FIG. 6A (and the other figures) represents the viewing direction of the driver 100. The viewing direction X basically represents the facial direction as corrected by the eyeball direction (to be described in detail later).

In FIG. 6B, the driver 100 presses the cross key 18 at a position based on the positional relationship of the vehicle-mounted devices (the navigation device 40, the audio device 42, and the air conditioner 44, which are arranged in this order from above), thereby determining an operation target device from among the vehicle-mounted devices. More specifically, since the position in the cross key 18 that corresponds to the audio device 42 is represented by the central button 30, the driver 100 presses the central button 30. Group A is selected and the central pilot lamp 22a is energized.

In FIG. 6C, the driver 100 operates the cross key 18 to adjust the volume of the audio device 42. More specifically, each time that the driver 100 presses the upper button 32, the volume increments by one level, and each time that the driver 100 presses the lower button 34, the volume decrements by one level. At this time, the driver 100 does not need to see the target area (area A1 in the central direction corresponding to group A) and the vehicle-mounted device 20 (audio device 42). Rather, the driver can operate the operation target device (audio device 42) while looking in the forward direction. To finish operating the operation target device, the driver 100 presses the central button 30.

3-2. Displaying the HUD 46 and Confirming Vehicle Speed and Mileage

Figure 7A:
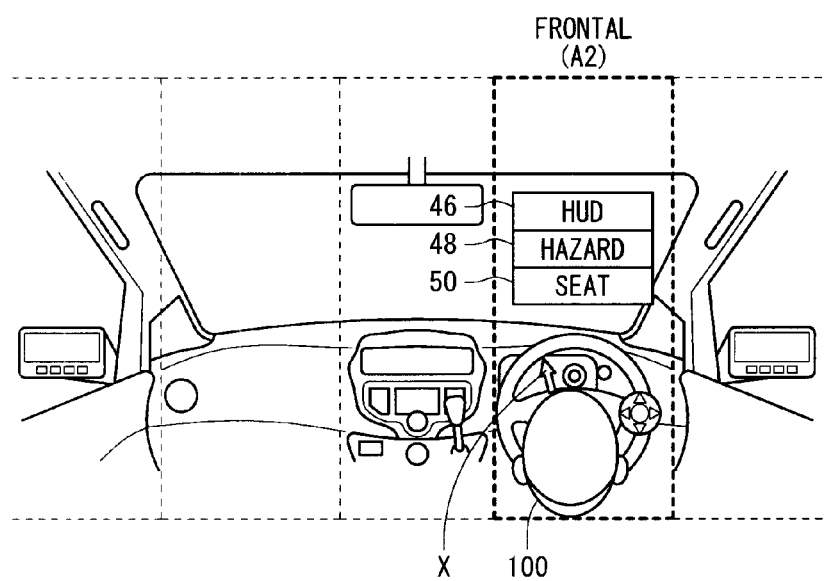
FIG. 7A is a view showing a head-up display (HUD) and a first example of operations performed by the driver for confirming vehicle speed and mileage.
Figure 7B:
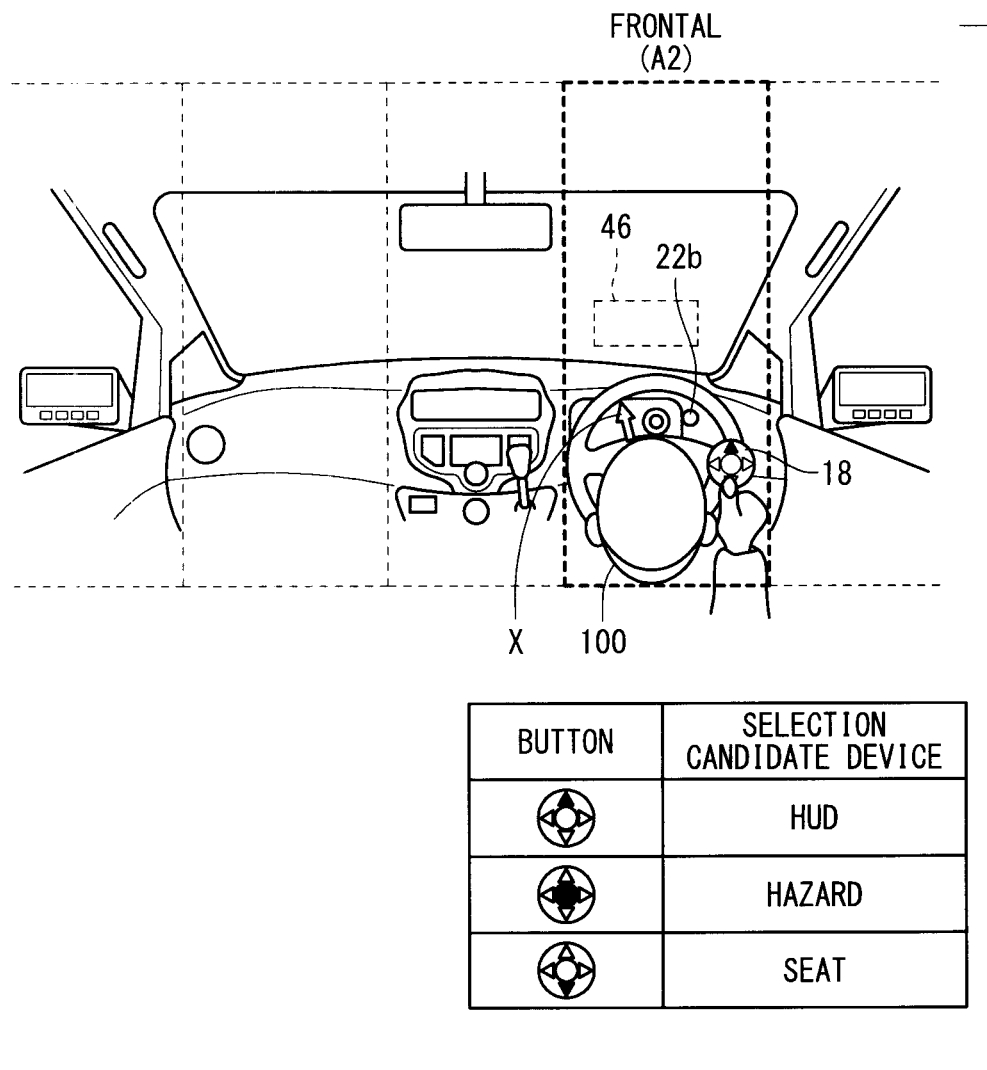
FIG. 7B is a view showing the displayed HUD and a second example of operations performed by the driver for confirming vehicle speed and mileage.
Figure 7C:
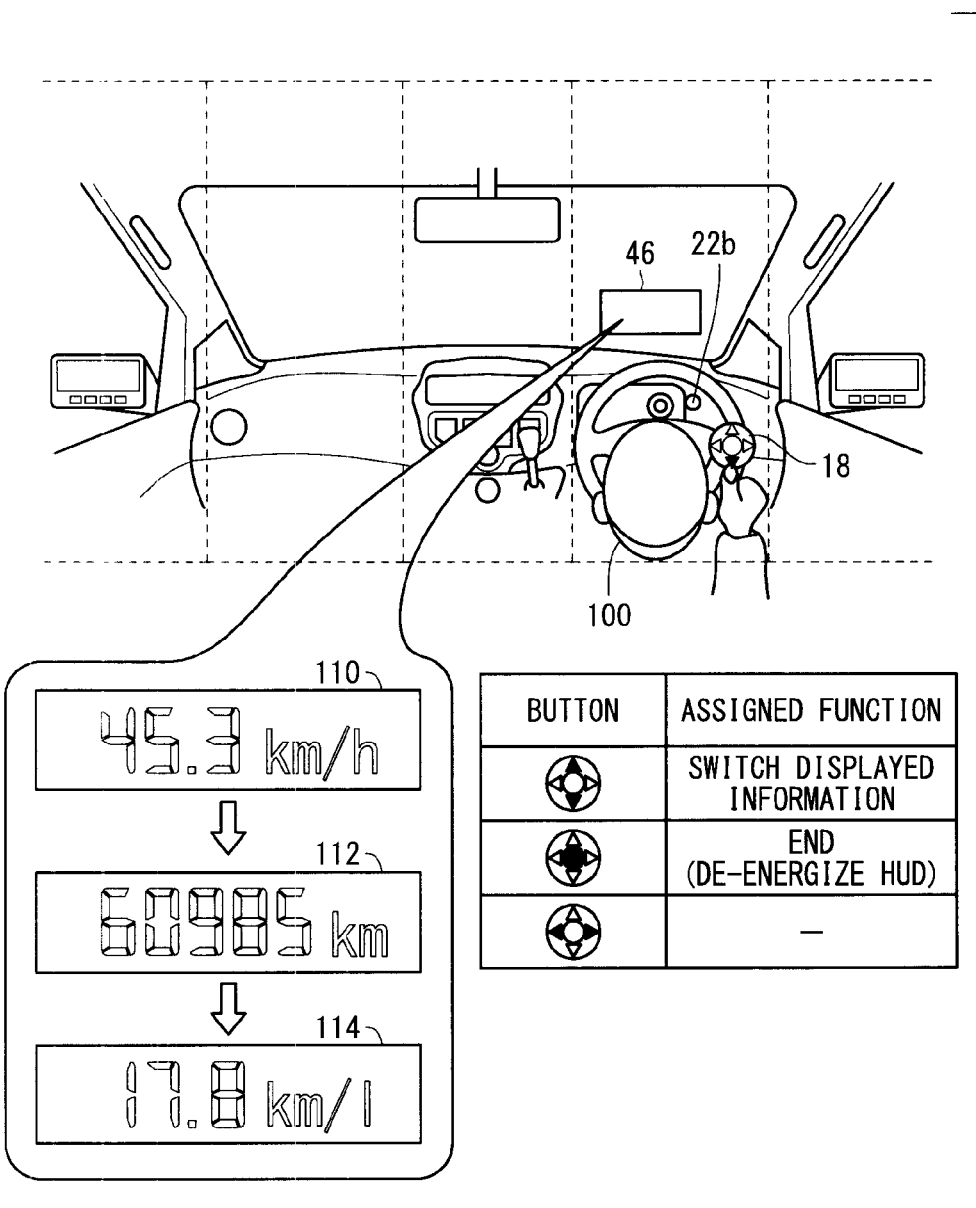
FIG. 7C is a view showing the displayed HUD and a third example of operations performed by the driver for confirming vehicle speed and mileage.

FIGS. 7A through 7C show first through third examples of operations performed by the driver 100 for confirming vehicle speed and mileage. As shown in FIG. 7A, the driver sees or turns the driver's face toward the area A2 (frontal direction) where the HUD 46 is present, from among all of the five areas A1 through A5. The ECU 24 then identifies the vehicle-mounted device group (group B) using the viewing direction judging technology.

In FIG. 7B, the driver 100 presses the cross key 18 at a position based on the positional relationship of the vehicle-mounted devices (the HUD 46, the hazard lamp 48, and the seat 50, which are arranged in this order from above), thereby determining an operation target device from among the vehicle-mounted devices. More specifically, since the position on the cross key 18 that corresponds to the HUD 46 is represented by the upper button 32, the driver presses the upper button 32, whereupon the front pilot lamp 22b becomes energized.

In FIG. 7C, the driver 100 operates the cross key 18 to switch between different displayed items on the HUD 46. More specifically, each time that the driver 100 presses the upper button 32, the HUD 46 switches from one displayed item to another displayed item according to a sequence from a vehicle speed 110, to a traveled distance 112, to a mileage 114, and back to the vehicle speed 110. Conversely, each time that the driver 100 presses the lower button 34, the HUD 46 switches from one displayed item to another displayed item according to a sequence from the vehicle speed 110, to the mileage 114, to the traveled distance 112, and back to the vehicle speed 110. The HUD 46 may display different items other than the vehicle speed 110, the traveled distance 112, and the mileage 114 (e.g., an amount of gasoline, a remaining battery level, and a distance that the vehicle can travel). At this time, the driver 100 does not need to view the target area (the area A2 in the frontal direction corresponding to group B) or the vehicle-mounted device 20 (HUD 46), but can operate the operation target device (HUD 46) while looking in the forward direction. To finish operating the operation target device, the driver 100 presses the central button 30, thereby de-energizing the HUD 46.

3-3. Opening and Closing of Front Passenger Seat-Side Window 58

Figure 8A:
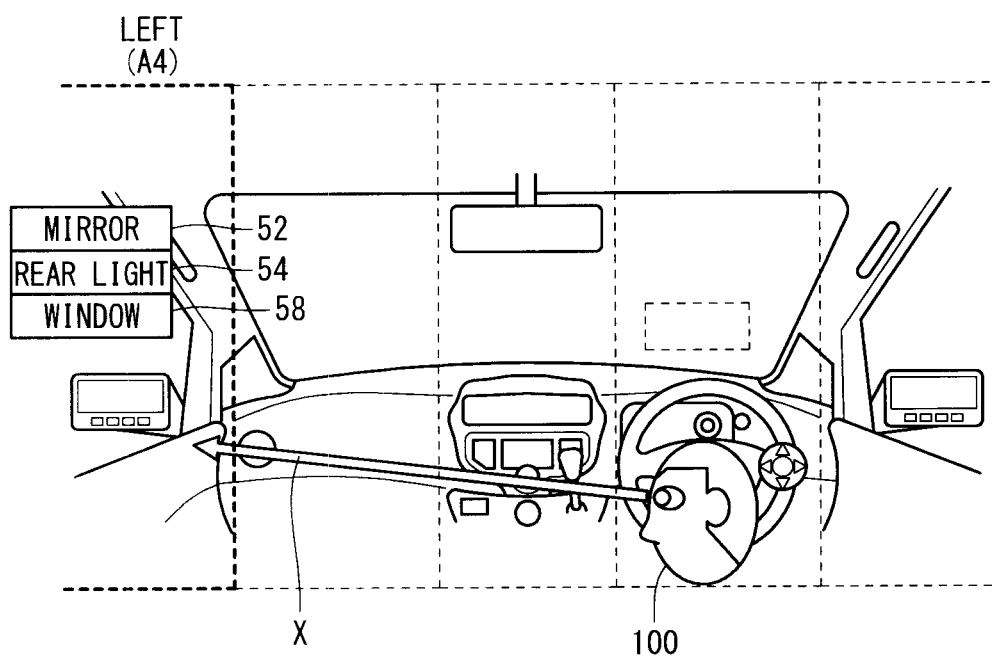
FIG. 8A is a view showing a first example of operations performed by the driver for opening and closing a front passenger seat-side window.
Figure 8B:
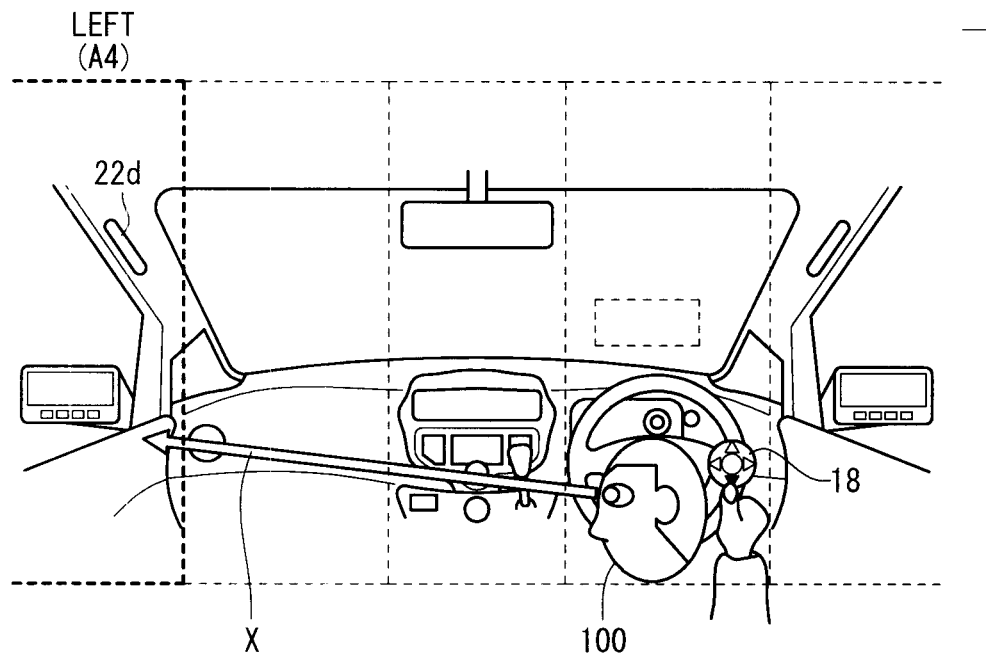
FIG. 8B is a view showing a second example of operations performed by the driver for opening and closing the front passenger seat-side window.
Figure 8C:
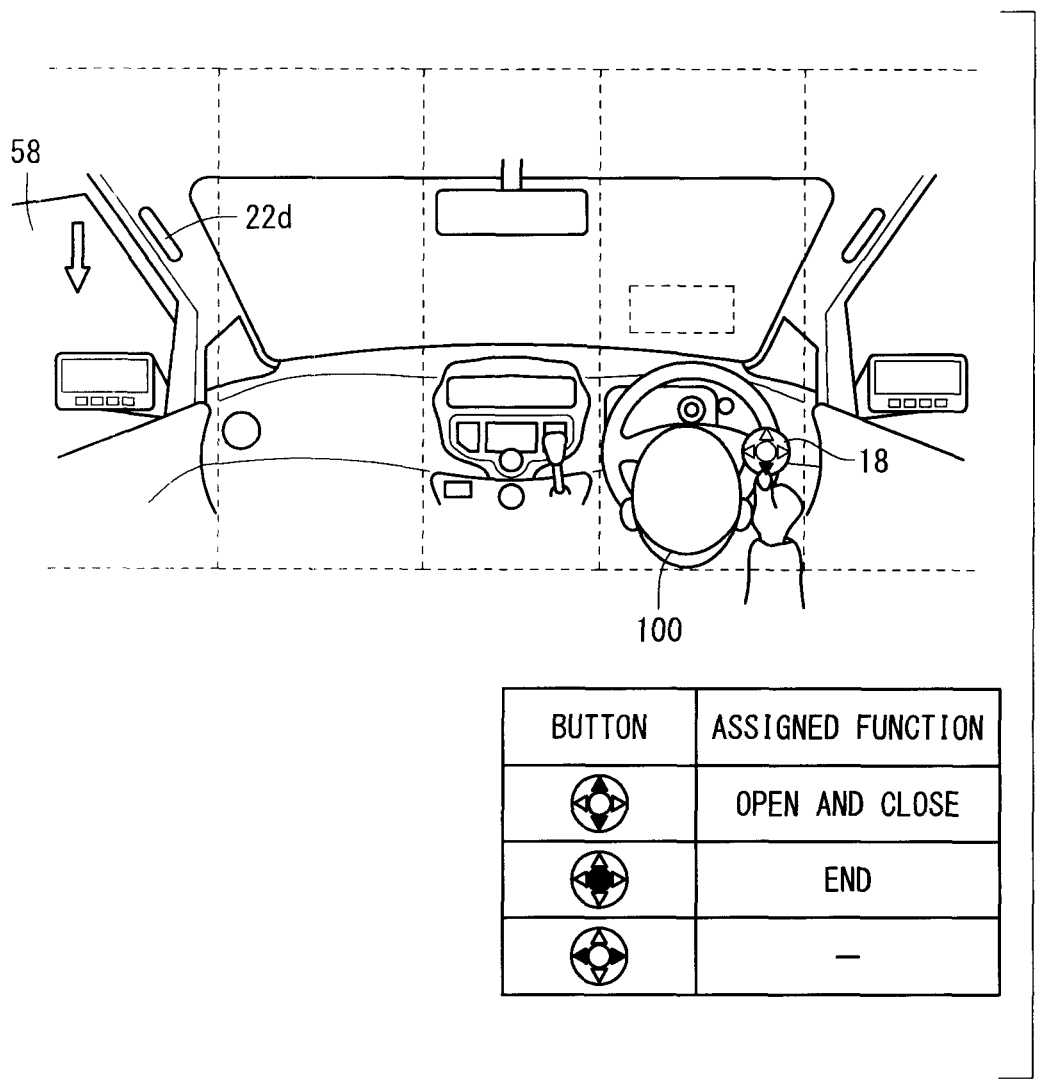
FIG. 8C is a view showing a third example of operations performed by the driver for opening and closing the front passenger seat-side window.

FIGS. 8A through 8C show first through third examples of operations performed by the driver 100 for opening and closing the front passenger seat-side window 58. As shown in FIG. 8A, the driver 100 sees or turns the driver's face toward the area A4 (leftward direction) where the front passenger seat-side window 58 is present, from among all of the five areas A1 through A5. The ECU 24 then identifies the vehicle-mounted device group (group D) using the viewing direction judging technology.

In FIG. 8B, the driver 100 presses the cross key 18 at a position based on the positional relationship of the vehicle-mounted devices (the door mirror 52, the rear light 54, and the front passenger seat-side window 58, which are arranged in this order from above), thereby determining an operation target device from among the vehicle-mounted devices. More specifically, since the position on the cross key 18 that corresponds to the front passenger seat-side window 58 is represented by the upper button 32 and the lower button 34, the driver 100 presses the upper button 32 or the lower button 34, whereupon the left pilot lamp 22d becomes energized.

The door mirror 52 and the rear light 54 are positionally related to each other in a vertical fashion. The front passenger seat-side window 58 may be positionally related in a vertical fashion either above or below the door mirror 52 and the rear light 54, depending on where a reference position is established for the front passenger seat-side window 58. In the present embodiment, an actuator (not shown) for the front passenger seat-side window 58 is used as a reference position. However, another reference position may be established for the front passenger seat-side window 58. Therefore, the corresponding relationship between the door mirror 52, the rear light 54, and the front passenger seat-side window 58 and the buttons on the cross key 18 may be changed. Usually, the door mirror 52 is unfolded and folded substantially horizontally, whereas the front passenger seat-side window 58 is opened and closed substantially vertically. In view of the directions in which the door mirror 52 and the front passenger seat-side window 58 are movable, the left button 36 and the right button 38 may be assigned to the door mirror 52, whereas the upper button 32 and the lower button 34 may be assigned to the front passenger seat-side window 58, to assist the driver 100 in operating them more intuitively.

In FIG. 8C, the driver 100 operates the cross key 18 to open and close the front passenger seat-side window 58. More specifically, each time that the driver 100 presses the lower button 34, the front passenger seat-side window 58 is opened, and each time that the driver 100 presses the upper button 32, the front passenger seat-side window 58 is closed. At this time, the driver 100 does not need to see the vehicle-mounted device 20 (the front passenger seat-side window 58), but can operate the operation target device (the front passenger seat-side window 58) while looking in the forward direction. To finish operating the operation target device, the driver 100 presses the central button 30.

4. Summary of Processes for Selecting Vehicle-Mounted Devices 20 and Operational Examples FIG. 9 is a diagram showing a list of processes for selecting and operating vehicle-mounted devices 20, and FIG. 10 is a diagram showing a list of buttons allocated to the vehicle-mounted devices. The driver 100 can easily operate the operation target devices by following the details in the lists shown in FIGS. 9 and 10.

5. Specific Flowcharts

5-1. Overall Flow

Figure 11:
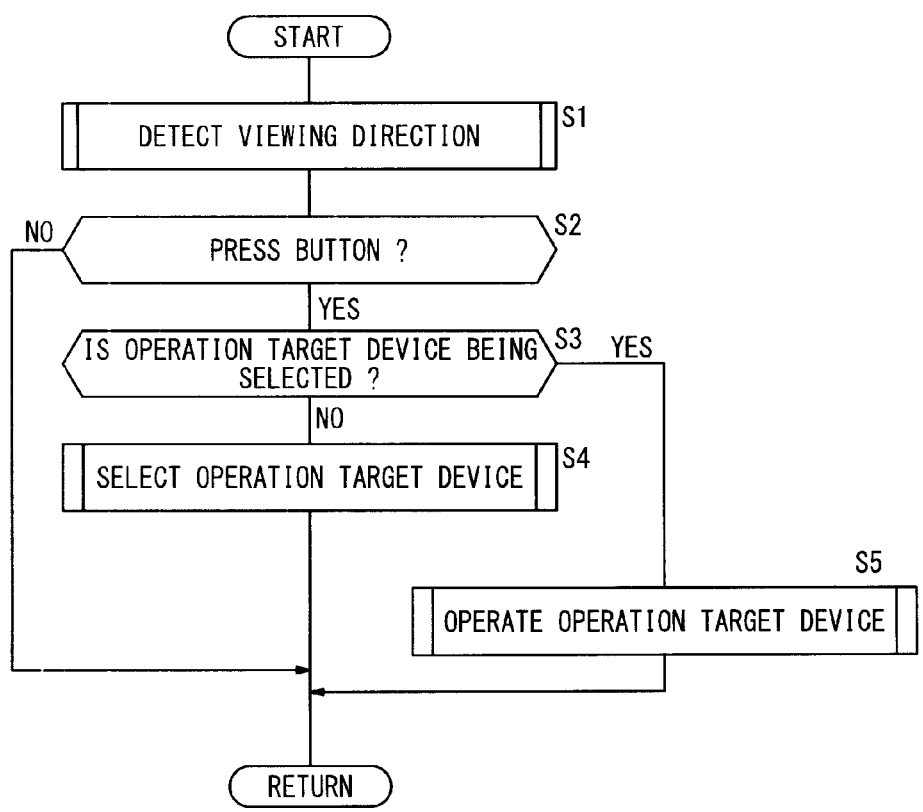
FIG. 11 is a flowchart of a sequence for selecting and operating a vehicle-mounted device.

FIG. 11 is a flowchart of a sequence for selecting and operating a vehicle-mounted device 20. In step S1, the ECU 24 detects a viewing direction of the driver 100 based on the facial image of the driver 100, which is acquired by the passenger camera 14. In step S2, the ECU 24 judges whether or not any one of the buttons of the cross key 18 has been pressed. If none of the buttons of the cross key 18 have been pressed (S2: NO), the present processing sequence is brought to an end. If one of the buttons of the cross key 18 has been pressed (S2: YES), then in step S3, the ECU 24 judges whether or not an operation target device is currently selected. If an operation target device is not currently selected (S3: NO), then in step S4, the ECU 24 selects an operation target device depending on an operation performed by the driver 100. If an operation target device is currently selected (S3: YES), then in step S5, the ECU 24 controls the operation target device depending on the operations performed by the driver 100.

5-2. Detection of Viewing Direction of Driver 100 (S1 in FIG. 11)

5-2-1. Summary

Figure 12:
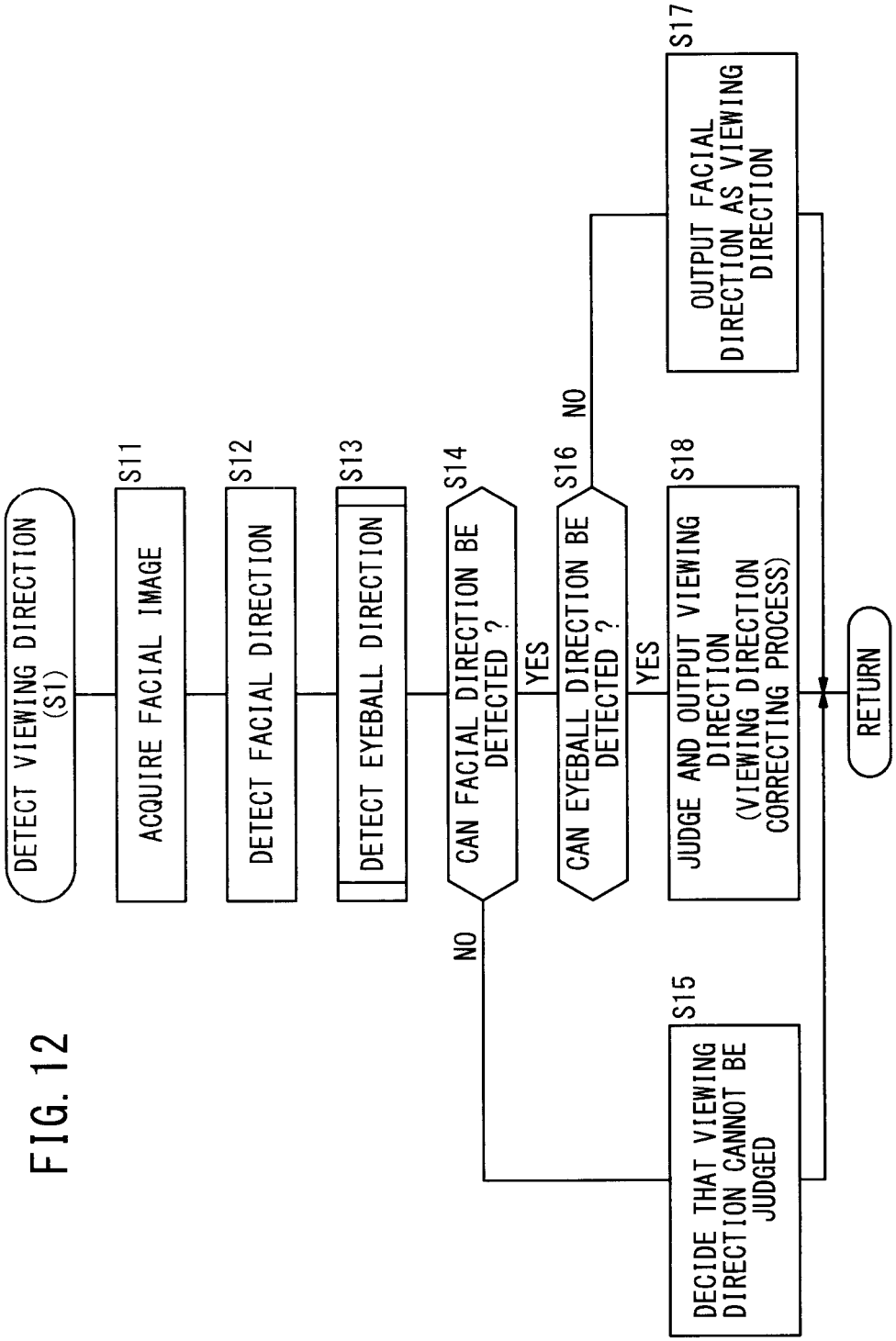
FIG. 12 is a flowchart of a sequence of operations of an electronic control unit (hereinafter referred to as an "ECU") for detecting a viewing direction.

FIG. 12 is a flowchart of a sequence of operations of the ECU 24 for detecting a viewing direction of the driver 100 (details of S1 in FIG. 11). In step S11, the ECU 24 captures the facial image of the driver 100 from the passenger camera 14. In step S12, the ECU 24 (facial direction detecting function 80) detects the facial direction of the driver 100 from the facial image.

The facial direction of the driver 100 can be detected by the following process, for example. The ECU 24 (facial direction detecting function 80) detects the central position of the face and the left and right end positions of the face based on the facial image output from the passenger camera 14. Based on the detected positions, the ECU 24 approximates the driver's face by a cylindrical shape and calculates the facial direction (cylindrical process). The facial direction referred to herein is used in a broad sense covering not only the front of the head but also other parts thereof (e.g., the back of the head).

The facial direction can be detected or determined only when the same detected result has continued for a given period of time, i.e., a first time T1 (e.g., a value in a range from 0.1 to 1.0 second).

In step S13, the ECU 24 (eyeball direction detecting function 82) detects the eyeball direction (relative position of the eyeball) of the driver 100 from the facial image. The ECU 24 thus detects the eyeball direction with respect to the face of the driver 100 (i.e., whether the eyeball is oriented to the front, the left, or the right of the face). Stated otherwise, the ECU 24 detects the relative position of part or all of the iris or the pupil with respect to a profile of the eye, which is open. The eyeball direction can be detected or determined only when the same detected result has continued for a given period of time, i.e., a second time T2 (e.g., a value in a range from 0.8 to 2.0 seconds). According to the present embodiment, the second time T2 is longer than the first time T1 by a prescribed value (in a range from twice to ten times). The eyeball direction may be detected for one eye or for both eyes. If the eyeball direction is detected for both eyes, then an average value of the eyes is used to determine the eyeball direction. Details concerning detection of the eyeball direction will be described later.

In step S14, the ECU 24 judges whether or not the facial direction could be detected in step S12. If the ECU 24 was capable of detecting the facial direction (S14: YES), then control proceeds to step S16. If the ECU 24 was not capable of detecting the facial direction (S14: NO), the ECU 24 decides that the viewing direction cannot be determined in step S15, and brings the present operation sequence to an end without selecting and operating an operation target device. The facial direction may not be detectable if the passenger camera 14 does not detect a sufficient amount of light due to being in a dark environment, or if the passenger camera 14 becomes saturated by detected light due to being in an excessively bright environment.

In step S16, the ECU 24 judges whether or not the eyeball direction could be detected in step S12. If the ECU 24 was capable of detecting the eyeball direction (S16: YES), then control proceeds to step S18. If the ECU 24 was not capable of detecting the eyeball direction (S16: NO), then in step S17, the ECU 24 outputs the facial direction directly as a viewing direction. The eyeball direction may not be detected when the passenger camera 14 cannot detect a sufficient amount of light due to being in a dark environment, or if the passenger camera 14 becomes saturated by detected light due to being in an excessively bright environment. It may also be difficult or impossible to detect the eyeball position because the driver 100 is wearing glasses (including sunglasses).

In step S18, the ECU 24 determines a viewing direction based on the facial direction and the eyeball direction. Stated otherwise, the ECU 24 corrects the viewing direction corresponding to the facial direction and depending on the eyeball direction (viewing direction correcting process). Then, the ECU 24 outputs the determined viewing direction for use in a subsequent process. Details of the process of determining the viewing direction will be described later.

5-2-2. Purpose of Viewing Direction Correcting Process

Figure 13A:
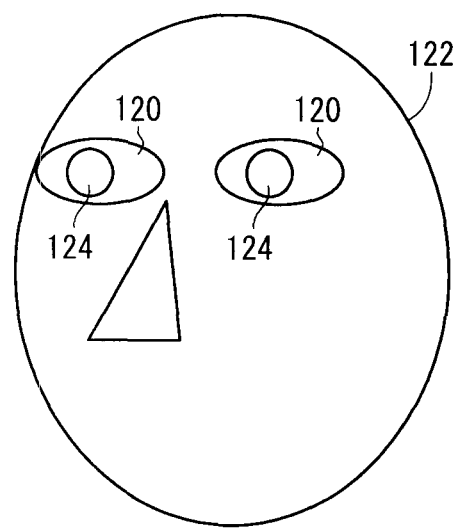
FIG. 13A is a side elevational view illustrative of an instance in which no deviation occurs between a facial direction and a viewing direction.
Figure 13B:
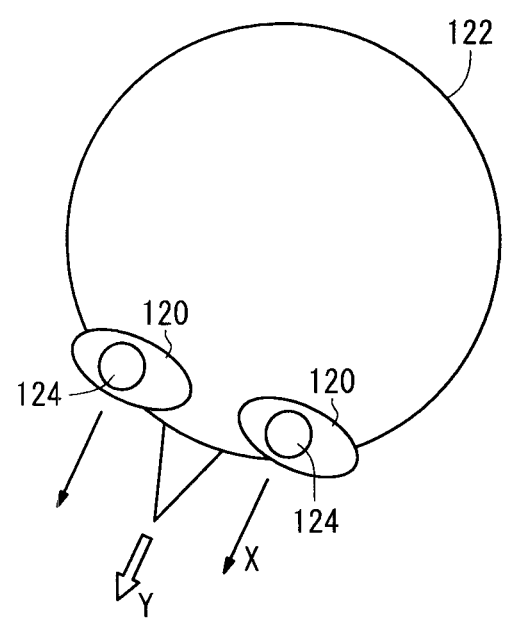
FIG. 13B is a plan view illustrative of an instance in which no deviation occurs between a facial direction and a viewing direction.
Figure 14A:
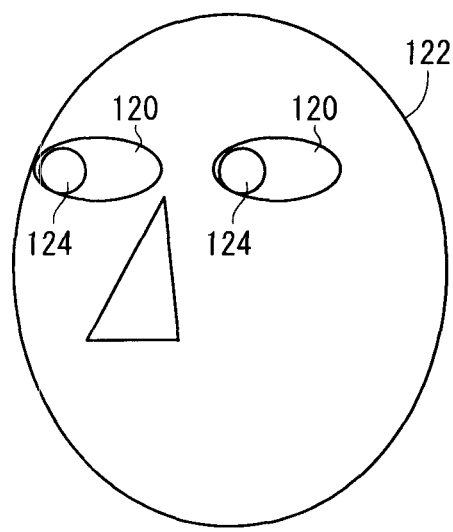
FIG. 14A is a side elevational view illustrative of an instance in which a deviation occurs between a facial direction and a viewing direction.
Figure 14B:
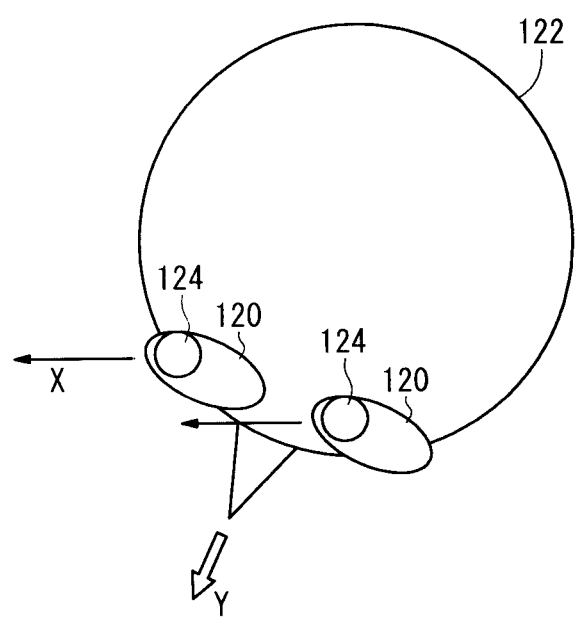
FIG. 14B is a plan view illustrative of an instance in which a deviation occurs between a facial direction and a viewing direction.

FIGS. 13A and 13B are side elevational and plan views, respectively, illustrating an instance in which there is no deviation between a facial direction Y and a viewing direction X. FIGS. 14A and 14B are side elevational and plan views, respectively, illustrating an instance in which there is a deviation between a facial direction Y and a viewing direction X. As shown in FIGS. 13A and 13B, when the eyes 120 (also referred to as "eyeballs 120") of the driver 100 are directed in the same direction as the face 122, the facial direction Y and the viewing direction X agree with each other. As shown in FIGS. 14A and 14B, when the eyes 120 of the driver 100 are directed in a direction different from the direction of the face 122, the facial direction Y and the viewing direction X do not agree with each other. When the facial direction Y and the viewing direction X do not agree with each other, if an operation target device is selected using only the facial direction Y, then an operation target device, which is not actually intended by the driver 100, is likely to be selected.

The viewing direction correcting process according to the present embodiment employs the viewing direction X, which represents the facial direction Y as corrected by the direction of the eyeballs 120 (the relative position of the eyeballs 120). The direction of the eyeballs 120 can be identified based on the position of the irises 124 or the pupils.

5-2-3. Detection Direction Eyeballs 120

Figure 15A:
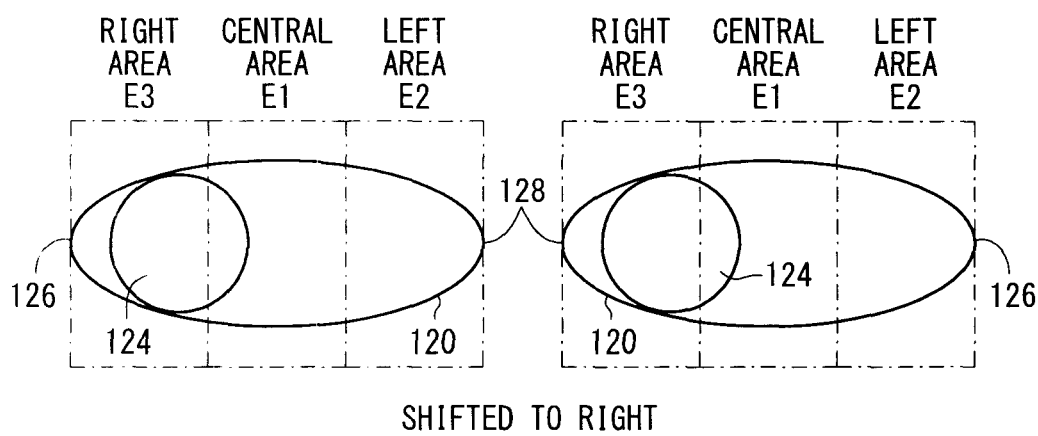
FIG. 15A is a view showing irises, which are shifted to the right.
Figure 15B:
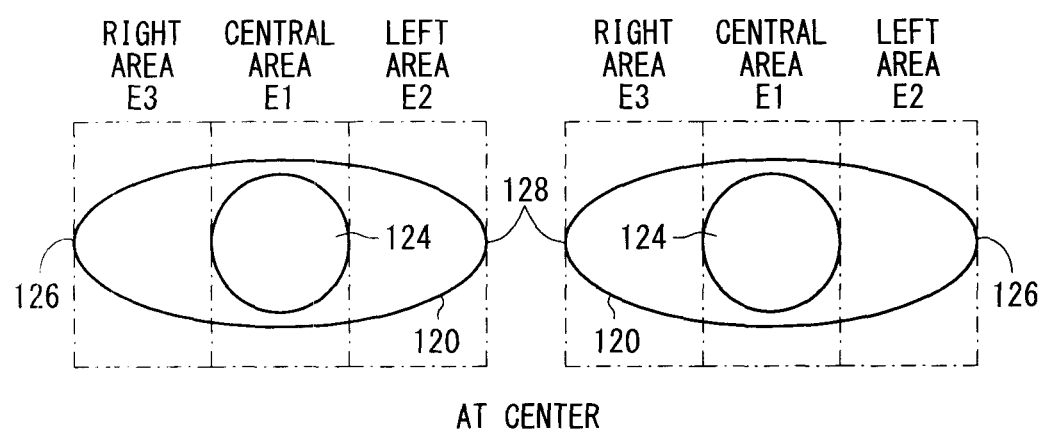
FIG. 15B is a view showing irises, which are positioned at the center.
Figure 15C:
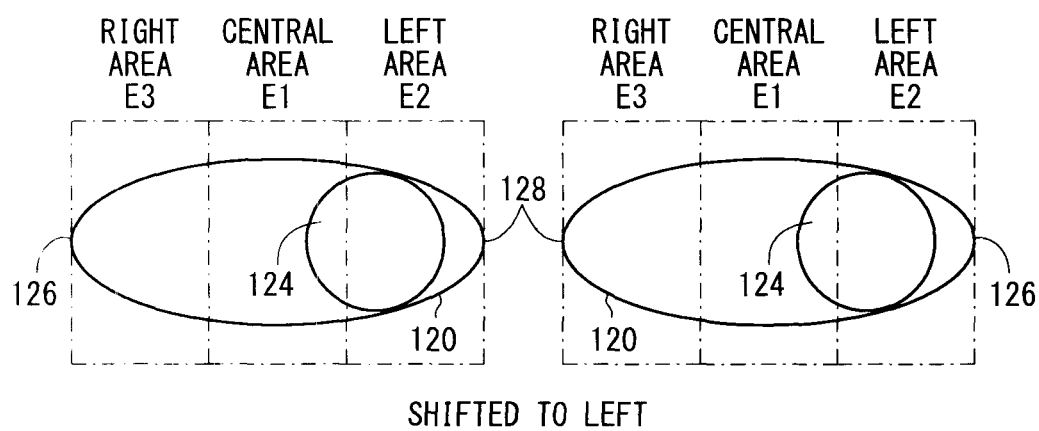
FIG. 15C is a view showing irises, which are shifted to the left.

FIG. 15A is a view showing the irises 124, which are shifted to the right. FIG. 15B is a view showing the irises 124, which are positioned at the center. FIG. 15C is a view showing the irises 124, which are shifted to the left. In FIGS. 15A through 15C, the eyes 120 are shown as viewed from an observer of the face 122 of the driver 100. The terms "LEFT" and "RIGHT" in FIGS. 15A through 15C are referred to from the perspective of the driver 100. Therefore, the terms left and right as expressed in FIGS. 15A through 15C are opposite to the terms left and right, which are recognized by the viewer of FIGS. 15A through 15C. The terms left and right may also be expressed in terms of the image capturing direction of the passenger camera 14 without any substantial changes.

As shown in FIGS. 15A through 15C, a profile for each of the eyes 120 is divided into three areas (a central area E1, a left area E2, and a right area E3). The direction of the eyeball 120 is judged by determining which one of the areas the iris 124 is present in. Areas E1 through E3 will be referred to collectively as a "viewing judgment area E" or simply an "area E".

Figure 16:
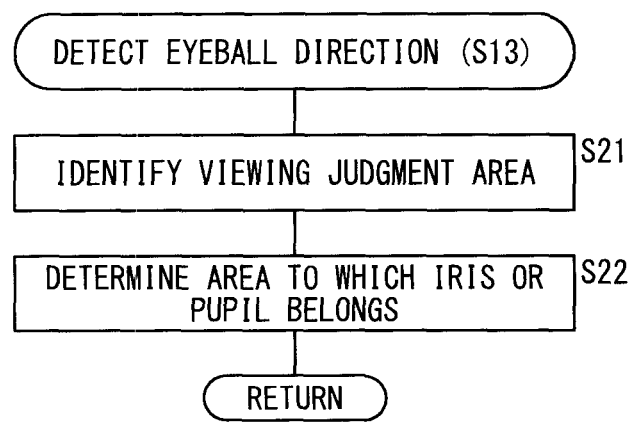
FIG. 16 is a flowchart of a sequence for detecting the direction of an eyeball.

FIG. 16 is a flowchart of a sequence for detecting the direction of an eyeball 120 (details of step S13 in FIG. 12). In step S21, the ECU 24 identifies a viewing judgment area E. For identifying the viewing judgment area E, the ECU 24 spots an outer corner 126 of the eye 120, i.e., an outermost end of the eye 120 (a rightmost end if the eye 120 is a right eye), and an inner corner 128 of the eye 120, i.e., an innermost end of the eye 120 (a leftmost end if the eye 120 is a right eye), from the facial image. Then, the ECU 24 divides the eye 120 into three equal areas between the outer corner 126 and the inner corner 128, which are treated as viewing judgment areas E.

The eyeball direction to be detected is determined along only the widthwise direction of the vehicle. If the direction or position of the eyeball 120 can be determined along the widthwise direction of the vehicle, then the eyeball 120 can be judged as belonging to one of the areas E1 through E3. A position (coordinates) along the widthwise direction of the vehicle, which represents the boundary between the central area E1 and the left area E2, may be defined as a first position P1, and a position (coordinates) along the widthwise direction of the vehicle, which represents the boundary between the central area E1 and the right area E3, may be defined as a second position P2.

According to the present embodiment, the outer corner 126 and the inner corner 128 are determined upon detection of the direction of the eyeball 120. However, the outer corner 126 and the inner corner 128 may be determined upon detection of the facial direction Y.

In step S22, the ECU 24 determines an area E to which the iris 124 or the pupil 130 (see FIG. 17A, etc.) belongs. The ECU 24 may determine such an area E by comparing the center or center of gravity of the iris 124 or the pupil 130 and the areas E, or by comparing the area of the iris 124 or the pupil 130 and the areas E, or by comparing the edges of the iris 124 or the pupil 130 and the areas E.

Figure 17A:
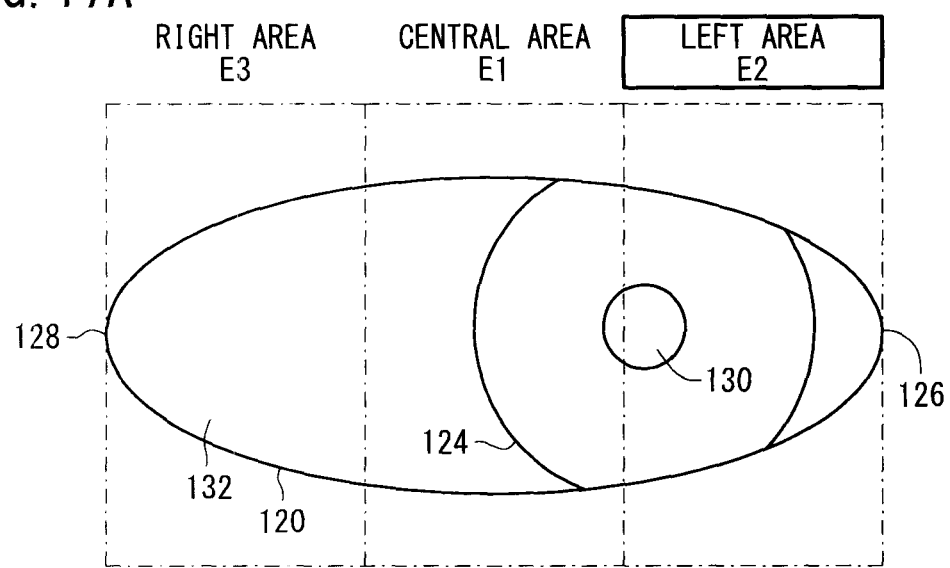
FIG. 17A is a first view illustrative of a process of judging an area to which an iris or a pupil belongs, by comparing a center or center of gravity of the iris or the pupil and areas, and comparing the area of the iris or the pupil and areas.
Figure 17B:
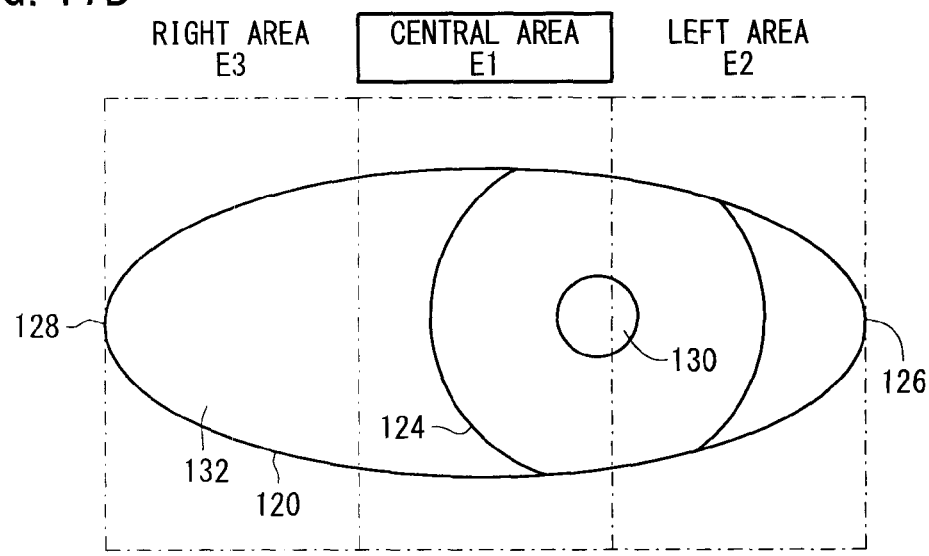
FIG. 17B is a second view illustrative of a process of judging an area to which an iris or a pupil belongs, by comparing a center or center of gravity of the iris or the pupil and areas, and comparing the area of the iris or the pupil and areas.
Figure 18A:
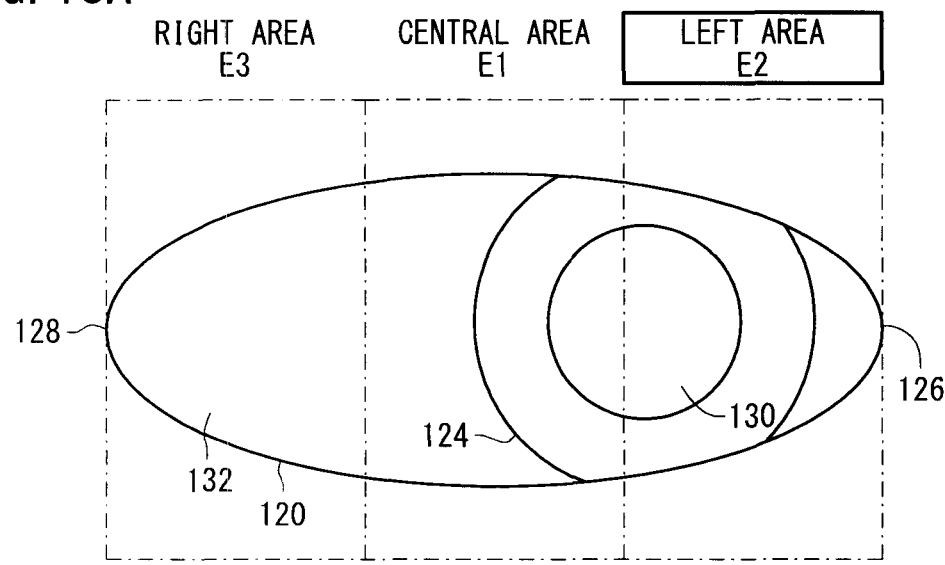
FIG. 18A is a third view illustrative of a process of judging an area to which an iris or a pupil belongs, by comparing a center or center of gravity of the iris or the pupil and areas, and comparing the area of the iris or the pupil and areas.
Figure 18B:
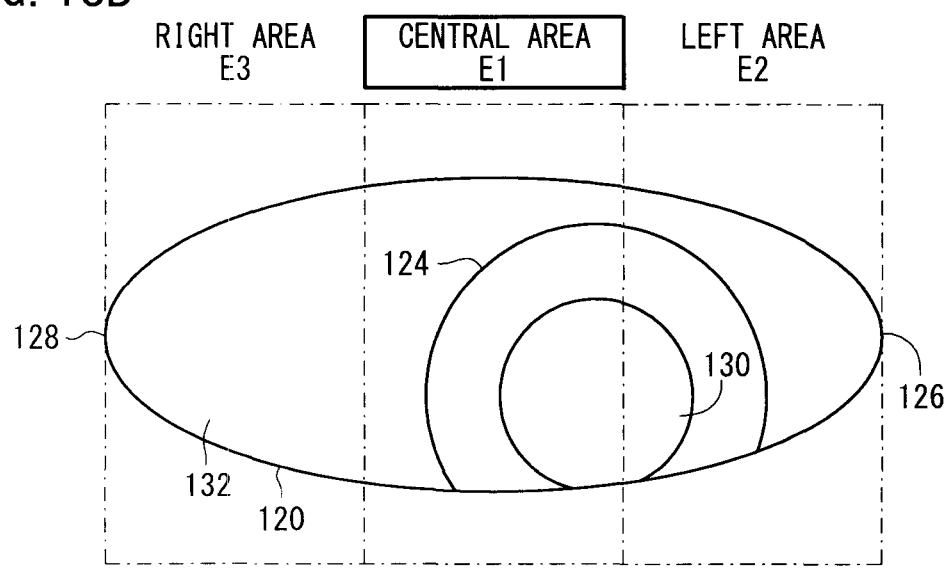
FIG. 18B is a fourth view illustrative of a process of judging an area to which an iris or a pupil belongs, by comparing a center or center of gravity of the iris or the pupil and areas, and comparing the area of the iris or the pupil and areas.

FIGS. 17A, 17B, 18A and 18B are first through fourth views, respectively, illustrating processes for determining an area E to which the iris 124 or the pupil 130 belongs, by comparing the center or center of gravity of the iris 124 or the pupil 130 and the areas E, or by comparing the area of the iris 124 or the pupil 130 and the areas E. FIGS. 17A, 17B, 18A and 18B show processes concerning the left eye. In FIGS. 17A and 17B, the pupil 130 is smaller. In FIGS. 18A and 18B, the pupil 130 is larger. In FIGS. 17A, 17B and 18A, the vertical position of the iris 124 or the pupil 130 is substantially centrally located. In FIG. 18B, the vertical position of the iris 124 or the pupil 130 is lower.

In FIGS. 17A and 18A, the center or center of gravity of the iris 124 or the pupil 130 is located in the left area E2. In other words, the area of the iris 124 or the pupil 130 is largest in the left area E2. Therefore, the eyeball 120 is shifted to the left. In FIGS. 17B and 18B, the center or center of gravity of the iris 124 or the pupil 130 is located in the central area E1. In other words, the area of the iris 124 or the pupil 130 is largest in the central area E1. Therefore, the eyeball 120 is located at the center of the eye 120.

The area E to which the iris 124 or the pupil 130 belongs may be determined by means of a different algorithm. For example, the area E to which the iris 124 or the pupil 130 belongs may be determined based on the ratio of the area of the iris 124 to the area of the sclera 132 (the white part of the eye) (the area of the iris 124/the area of the sclera 132).

Figure 19A:
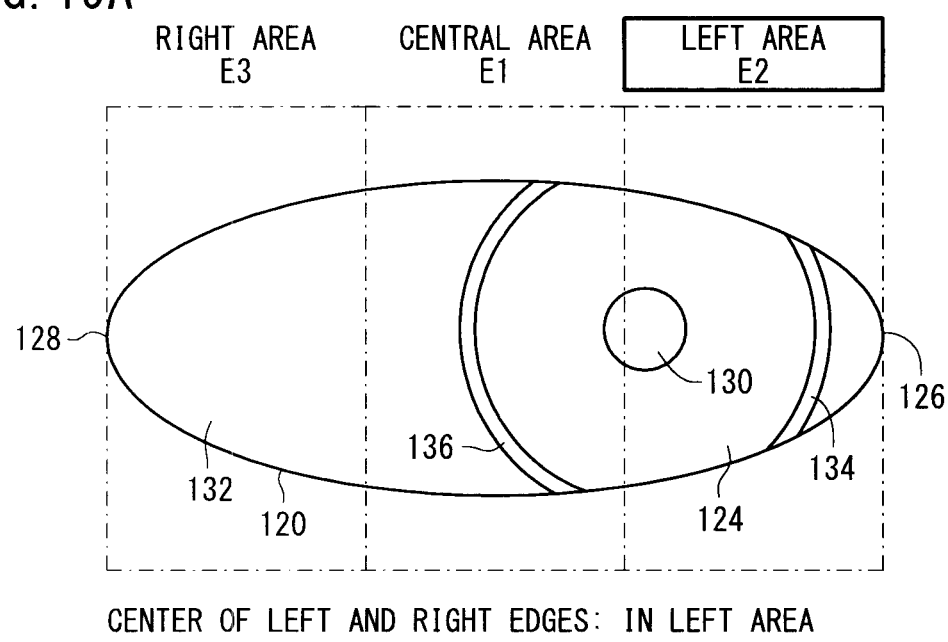
FIG. 19A is a first view illustrative of a process of judging an area to which an iris or a pupil belongs, by comparing vertical edges (left and right edges) of the iris or the pupil and areas.
Figure 20A:
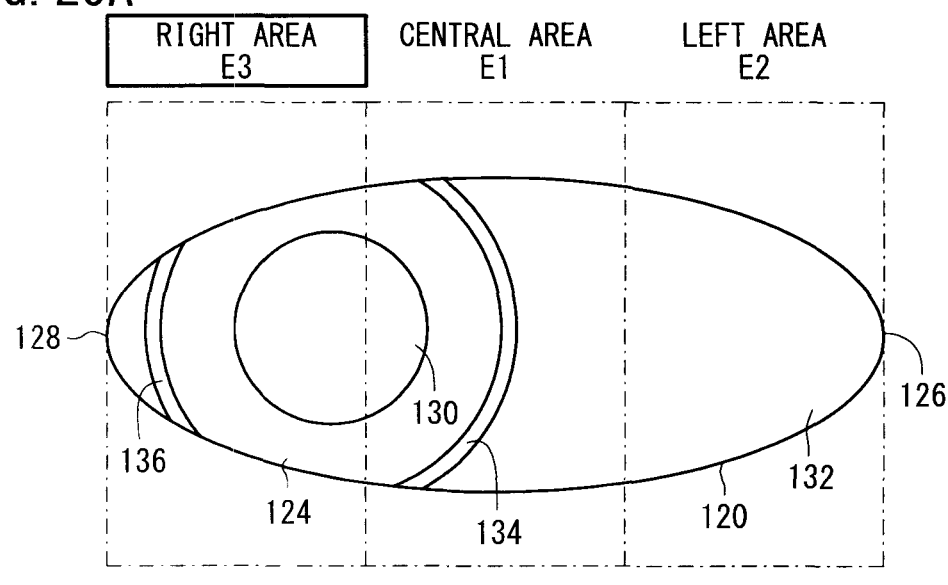
FIG. 20A is a third view illustrative of a process of judging an area to which an iris or a pupil belongs, by comparing vertical edges (left and right edges) of the iris or the pupil and areas.

FIGS. 19A, 19B, 20A and 20B are first through fourth views, respectively, illustrating processes for determining an area E to which the iris 124 or the pupil 130 belongs, by comparing vertical edges (a left edge 134 and a right edge 136) of the iris 124 and the areas E. FIGS. 19A, 19B, 20A and 20B show processes concerning the left eye. In FIGS. 19A and 19B, the pupil 130 is smaller. In FIGS. 20A and 20B, the pupil 130 is larger. In FIGS. 19A, 19B and 20A, the vertical position of the iris 124 or the pupil 130 is substantially centrally located. In FIG. 20B, the vertical position of the iris 124 or the pupil 130 is lower. The vertical edges (the left edge 134 and the right edge 136) of the iris 124 are detected according to an image processing technique. Vertical edges of the pupil 130 may be used instead of vertical edges of the iris 124.

In FIG. 19A, the center of a line interconnecting the centers of the left edge 134 and the right edge 136 is located in the left area E2. Therefore, the eyeball 120 is shifted to the left. In FIGS. 19B and 20B, the center of the line interconnecting the centers of the left edge 134 and the right edge 136 is located in the central area E1. Therefore, the eyeball 120 is located at the center of the eye 120. In FIG. 20A, the center of the line interconnecting the centers of the left edge 134 and the right edge 136 is located in the right area E3. Therefore, the eyeball 120 is shifted to the right.

The area E to which the iris 124 or the pupil 130 belongs may be determined by a different algorithm. For example, the area E to which the iris 124 or the pupil 130 belongs may be determined based on positions of the left edge 134 and the right edge 136 with respect to the areas E. For example, if the left edge 134 is positioned to the left of the center of the left area E2, the iris 124 or the pupil 130 is judged as belonging to the left area E. If the right edge 136 is positioned to the right of the center of the right area E3, the iris 124 or the pupil 130 is judged as belonging to the right area E3. Alternatively, the area E to which the iris 124 or the pupil 130 belongs may be determined based on the ratio or difference between lengths of the left edge 134 and the right edge 136. For example, if the ratio or difference exceeds a first threshold value, then the iris 124 or the pupil 130 is judged as belonging to the left area E2, and if the ratio or difference exceeds a second threshold value, then the iris 124 or the pupil 130 is judged as belonging to the right area E3.

5-2-4. Judgment of Viewing Direction X

Figure 22B:
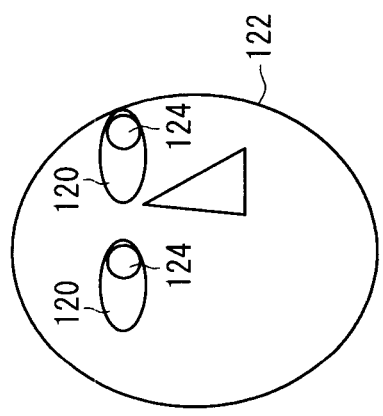
FIG. 22B is a view showing a second specific example, which is illustrative of the relationship shown in FIG. 21.
Figure 22C:
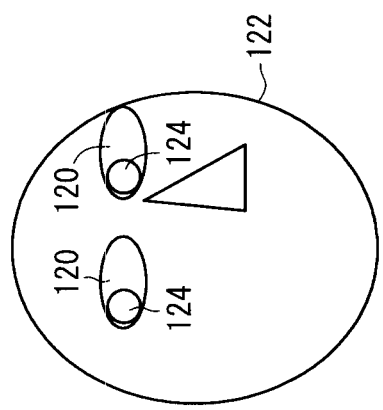
FIG. 22C is a view showing a third specific example, which is illustrative of the relationship shown in FIG. 21.

FIG. 21 is a table showing the relationship between combinations of the facial direction Y, the direction of the eyeball 120, and the viewing direction X. FIGS. 22A through 22C are views showing first through third specific examples, which are illustrative of the relationship shown in FIG. 21.

The following basic ideas are presented concerning the relationship between combinations of the facial direction Y, the direction of the eyeball 120, and the viewing direction X. When the direction of the eyeball 120 is central (frontal), the facial direction Y is regarded as the viewing direction X. When the direction of the eyeball 120 is to the left (leftward direction), the facial direction Y as corrected in the leftward direction is regarded as the viewing direction X. When the direction of the eyeball 120 is to the right (rightward direction), the facial direction Y as corrected in the rightward direction is regarded as the viewing direction X. If the direction of the face 122 and the direction of the eyeball 120 are opposite to each other, then the direction of the face 122 is used as the viewing direction X.

According to the present embodiment, more specifically, a viewing direction X is judged in the following manner. First, one of the areas A1 through A5 (FIG. 5), which corresponds to the facial direction Y, is identified. When the direction of the eyeball 120 is central, one of the areas A1 through A5 (FIG. 5), which corresponds to the facial direction Y, is used. When the direction of the eyeball 120 is to the left, an area that is leftwardly next to one of the areas A1 through A5 that corresponds to the facial direction Y is used. When the direction of the eyeball 120 is to the right, an area that is rightwardly next to one of the areas A1 through A5 that corresponds to the facial direction Y is used.

If the facial direction Y and the direction of the eyeball 120 are opposite to each other, then one of the areas A1 through A5, which corresponds to the facial direction Y, is used. When the face 122 is directed to the left (the facial direction Y corresponds to one of the areas A1, A4, A5) and the direction of the eyeball 120 is to the right, then one of the areas A1, A4, or A5, which corresponds to the facial direction Y, is used. Similarly, when the face 122 is directed to the right (the facial direction Y corresponds to the area A3 in the rightward direction) and the direction of the eyeball 120 is to the left, the area A3, which corresponds to the facial direction Y, is used.

For example, if the area corresponding to the facial direction Y is the area A1 in the central direction and the direction of the eyeball 120 is central, as shown in FIGS. 21 and 22A, the area A1 corresponding to the facial direction Y is used as the viewing direction X.

If the area corresponding to the facial direction Y is the area A1 in the central direction and the direction of the eyeball 120 is to the left, as shown in FIGS. 21 and 22B, an area (the area A5 in the other direction), which is leftwardly next to the area A1 corresponding to the facial direction Y, is used as the viewing direction X.

If the area corresponding to the facial direction Y is the central area A1 and the direction of the eyeball 120 is to the right, as shown in FIGS. 21 and 22C, the area A1 corresponding to the facial direction Y is used as the viewing direction X. This is because the area A1 in the central direction is more leftward than the area A2 in the frontal direction, and the face 122 is directed to the left, whereas conversely, the direction of the eyeball 120 is to the right (rightward direction).

It has been described above that when the direction of the eyeball 120 is located to the left or to the right, the areas A1 through A5 are shifted one area to the left or to the right. However, the present invention is not limited to such a process. If the direction of the eyeball 120 is divided into four or more zones, then the areas A1 through A5 (or alternatively, more or less areas) may be shifted two or more zones to the left or right depending on the direction of the eyeball 120. Further, instead of shifting the areas A1 through A5, the following process may be used. A corrective quantity α for the facial direction Y (angle) is calculated depending on the direction of the eyeball 120. The angle represented by the sum of the detected facial direction Y and the corrective quantity α corresponds to one of the areas A1 through A5.

5-3. Selection of Operation Target Device (S4 in FIG. 11)

5-3-1. Summary

Figure 23:
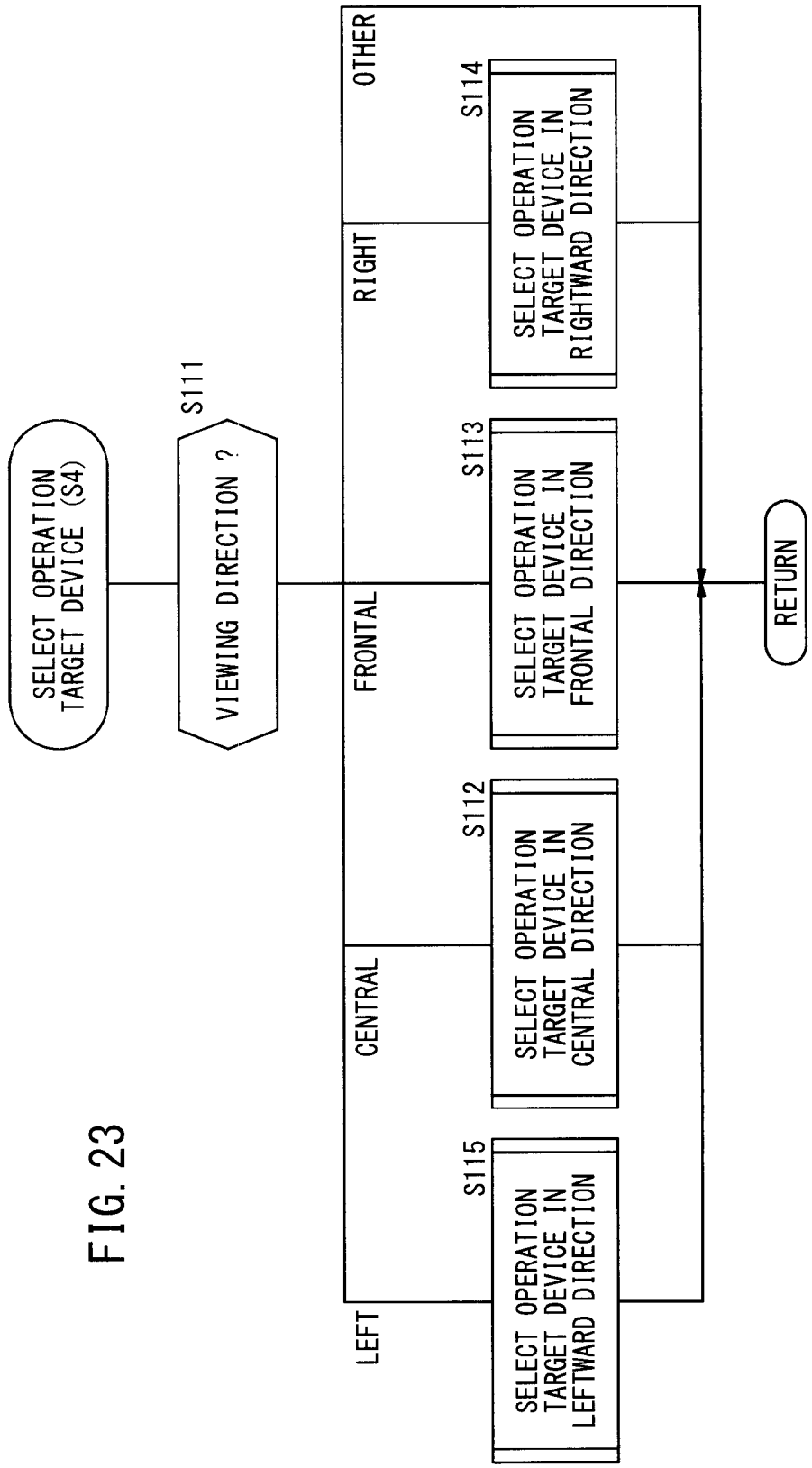
FIG. 23 is a flowchart of an operation sequence of the ECU for selecting an operation target device.

FIG. 23 is a flowchart of a sequence of operations performed by the ECU 24 for selecting an operation target device (details of S4 in FIG. 11). In step S111, the ECU 24 confirms whether the viewing direction X (representing the facial direction as corrected by the eyeball direction) of the driver 100, which was identified in step S1 in FIG. 11, is a central, a frontal, a rightward, or a leftward direction, or another direction.

If the viewing direction X of the driver 100 is the central direction (area A1), then in step S112, the ECU 24 identifies the vehicle-mounted device group in the central direction, i.e., group A, which includes the navigation device 40, the audio device 42, and the air conditioner 44, and selects an operation target device from among group A.

If the viewing direction X of the driver 100 is the frontal direction (area A2), then in step S113, the ECU 24 identifies the vehicle-mounted device group in the frontal direction, i.e., group B, which includes the HUD 46, the hazard lamp 48, and the seat 50, and selects an operation target device from among group B.

If the viewing direction X of the driver 100 is the rightward direction (area A3), then in step S114, the ECU 24 identifies the vehicle-mounted device group in the rightward direction, i.e., group C, which includes the door mirror 52, the rear light 54, and the driver seat-side window 56, and selects an operation target device from among group C.

If the viewing direction X of the driver 100 is the leftward direction (area A4), then in step S115, the ECU 24 identifies the vehicle-mounted device group in the leftward direction, i.e., group D, which includes the door mirror 52, the rear light 54, and the front passenger seat-side window 58, and selects an operation target device from among group D.

If the viewing direction X of the driver 100 is another direction (area A5), the ECU 24 does not select any of the vehicle-mounted devices 20, and brings the present operation sequence to an end.

5-3-2. Central Direction

Figure 24:
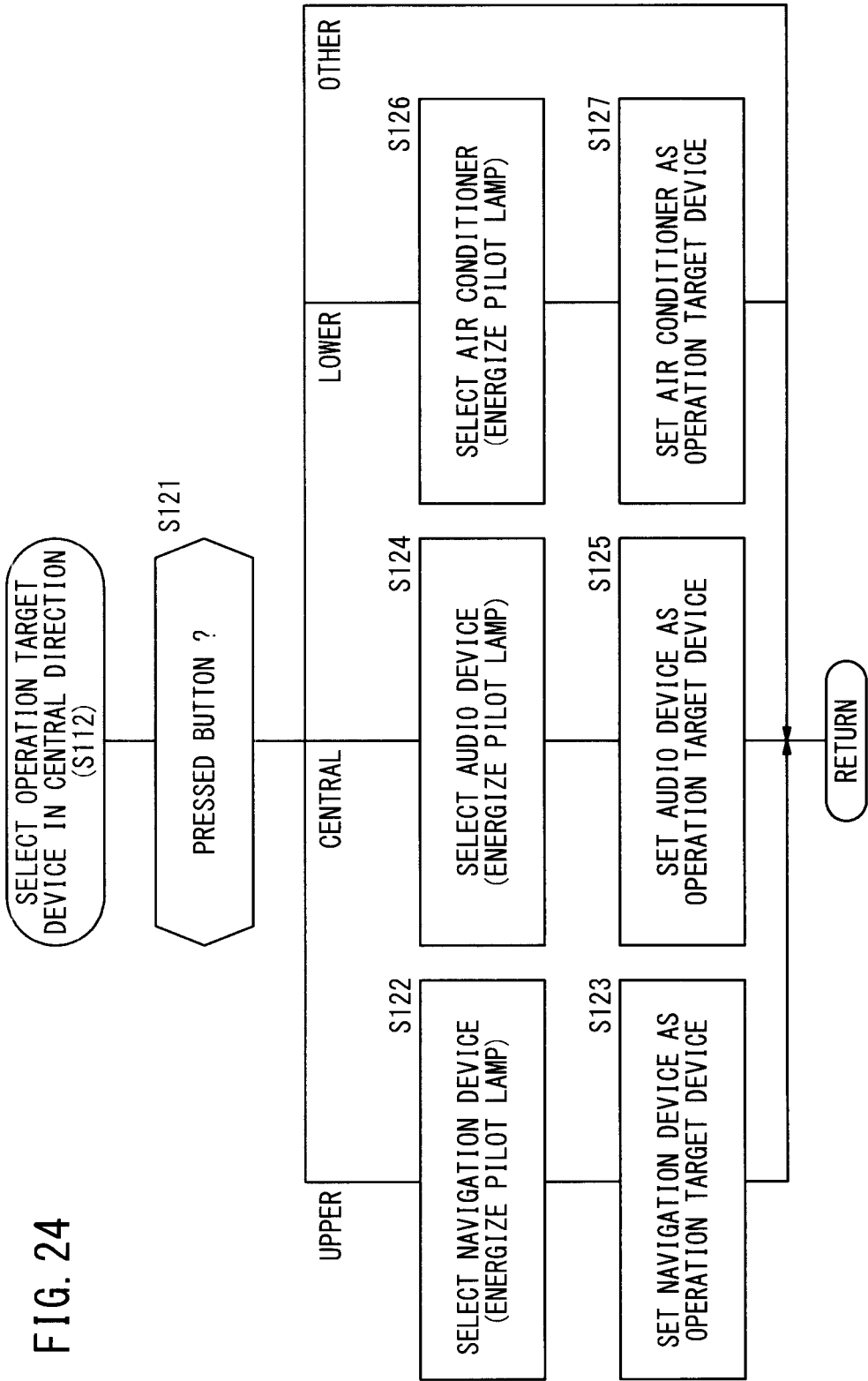
FIG. 24 is a flowchart of an operation sequence for selecting an operation target device when the viewing direction of the driver is a central direction.

FIG. 24 is a flowchart of a sequence of operations for selecting an operation target device when the viewing direction X of the driver 100 is the central direction (area A1) (details of S112 in FIG. 23). In step S121, the ECU 24 judges whether the pressed button on the cross key 18 is the central button 30, the upper button 32, the lower button 34, or another button.

If the pressed button is the upper button 32, then in step S122, the ECU 24 selects the navigation device 40 and energizes the central pilot lamp 22a. In step S123, the ECU 24 sets the navigation device 40 as the operation target device.

If the pressed button is the central button 30, then in step S124, the ECU 24 selects the audio device 42 and energizes the central pilot lamp 22a. In step S125, the ECU 24 sets the audio device 42 as the operation target device.

If the pressed button is the lower button 34, then in step S126, the ECU 24 selects the air conditioner 44 and energizes the central pilot lamp 22a. In step S127, the ECU 24 sets the air conditioner 44 as the operation target device.

If the pressed button is none one of the upper button 32, the central button 30, or the lower button 34, the ECU 24 brings the operation sequence to an end.

5-3-3. Frontal Direction

Figure 25:
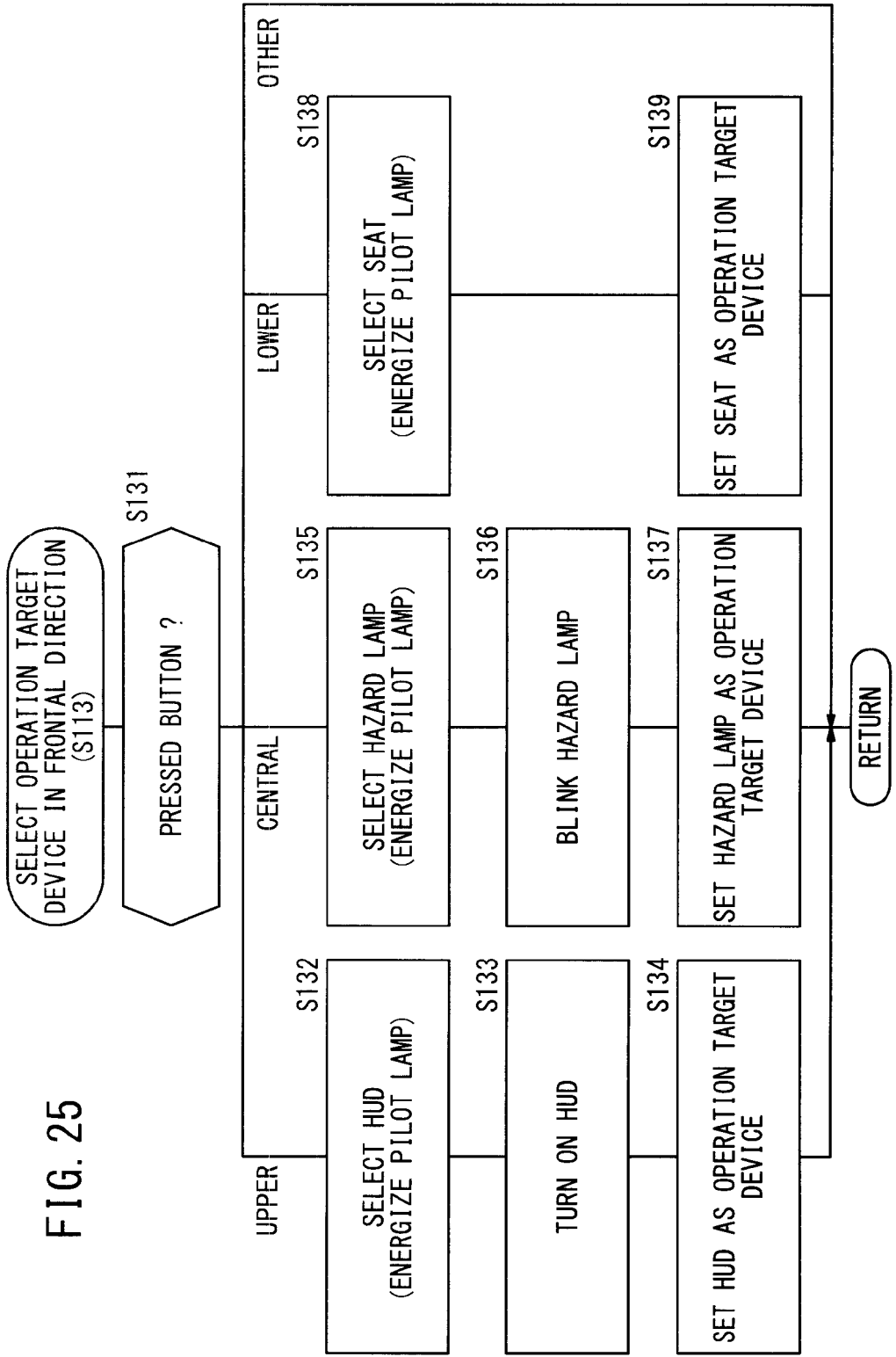
FIG. 25 is a flowchart of an operation sequence for selecting an operation target device when the viewing direction of the driver is a forward direction.

FIG. 25 is a flowchart of a sequence of operations for selecting an operation target device when the viewing direction X of the driver 100 is the frontal direction (area A2) (details of S113 in FIG. 23). In step S131, the ECU 24 judges whether the pressed button on the cross key 18 is the central button 30, the upper button 32, or the lower button 34.

If the pressed button is the upper button 32, then in step S132, the ECU 24 selects the HUD 46 and energizes the front pilot lamp 22b. In step S133, the ECU 24 turns on the HUD 46, whereupon the HUD 46 is displayed on the front windshield 11. In step S134, the ECU 24 sets the HUD 46 as the operation target device.

If the pressed button is the central button 30, then in step S135, the ECU 24 selects the hazard lamp 48 and energizes the front pilot lamp 22b. In step S136, the ECU 24 blinks the hazard lamp 48. In step S137, the ECU 24 sets the hazard lamp 48 as the operation target device.

If the pressed button is the lower button 34, then in step S138, the ECU 24 selects the seat 50 and energizes the front pilot lamp 22b. In step S139, the ECU 24 sets the seat 50 as the operation target device.

If the pressed button is none of the upper button 32, the central button 30, or the lower button 34, the ECU 24 brings the present operation sequence to an end.

5-3-4. Rightward Direction

Figure 26:
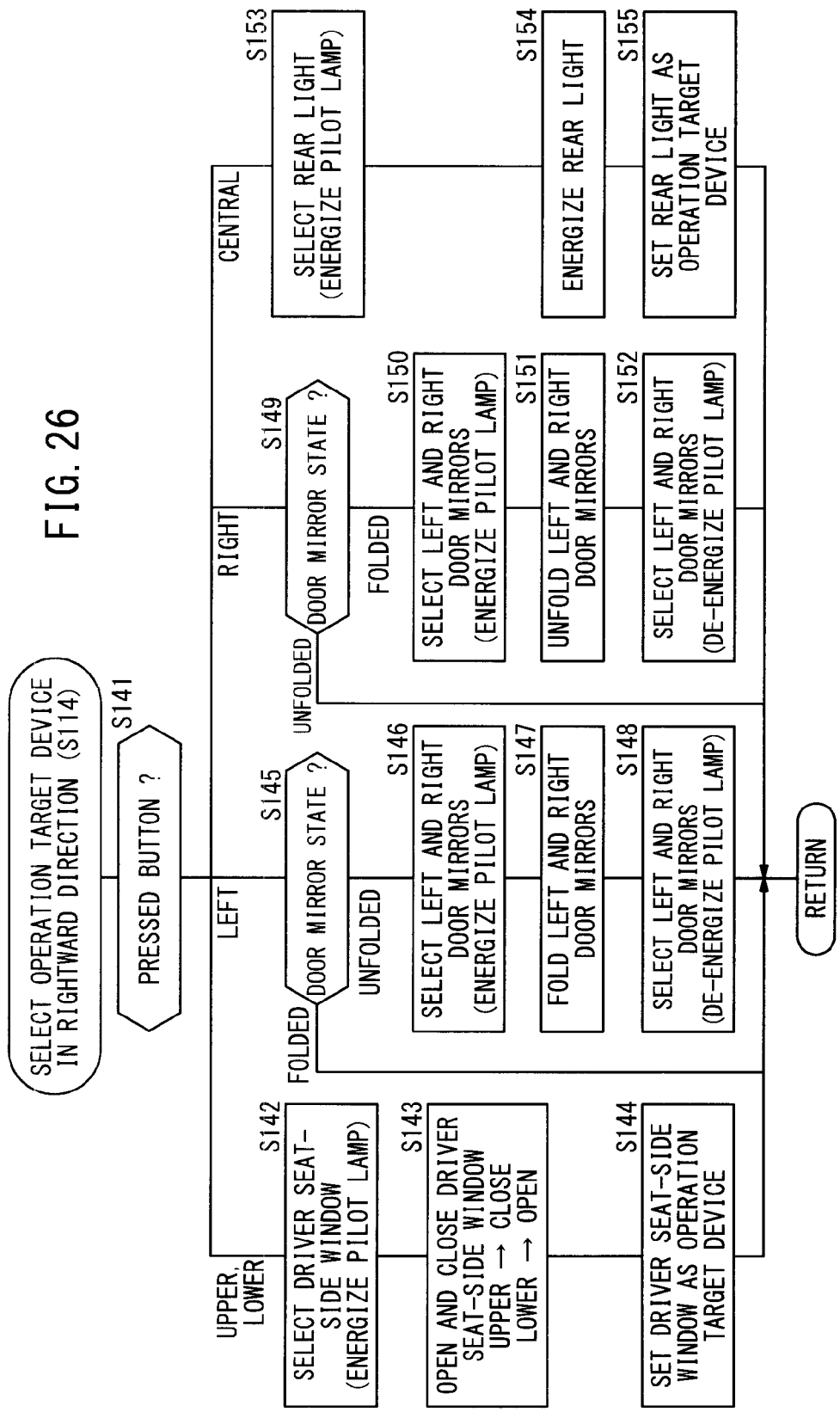
FIG. 26 is a flowchart of an operation sequence for selecting an operation target device when the viewing direction of the driver is a rightward direction.

FIG. 26 is a flowchart of a sequence of operations for selecting an operation target device when the viewing direction X of the driver 100 is the rightward direction (area A3) (details of S114 in FIG. 23). In step S141, the ECU 24 judges whether the pressed button on the cross key 18 is the central button 30, the upper button 32, the lower button 34, the left button 36, or the right button 38.

If the pressed button is the upper button 32 or the lower button 34, then in step S142, the ECU 24 selects the driver seat-side window 56 and energizes the right pilot lamp 22c. In step S143, the ECU 24 opens or closes the driver seat-side window 56. More specifically, if the lower button 34 is pressed, the ECU 24 opens the driver seat-side window 56, and if the upper button 32 is pressed, the ECU 24 closes the driver seat-side window 56. In step S144, the ECU 24 sets the driver seat-side window 56 as the operation target device.

If the pressed button is the left button 36, then in step S145, the ECU 24 confirms the state (unfolded or folded) of the door mirror 52. If the door mirror 52 is in a folded state, the ECU 24 brings the present operation sequence to an end. If the door mirror 52 is in an unfolded state, then in step S146, the ECU 24 selects both the left and right door mirrors 52 and energizes the right pilot lamp 22c.

In step S147, the ECU 24 folds the left and right door mirrors 52. In step S148, the ECU 24 selects the left and right door mirrors 52 and deenergizes the right pilot lamp 22c.

If the pressed button is the right button 38, then in step S149, the ECU 24 confirms the state (unfolded or folded) of the door mirror 52. If the door mirror 52 is in an unfolded state, the ECU 24 brings the present operation sequence to an end. If the door mirror 52 is in a folded state, then in step S150, the ECU 24 selects both the left and right door mirrors 52 and energizes the right pilot lamp 22c.

In step S151, the ECU 24 unfolds the left and right door mirrors 52. In step S152, the ECU 24 selects the left and right door mirrors 52 and deenergizes the right pilot lamp 22c.

If the pressed button is the central button 30, then in step S153, the ECU 24 selects the rear light 54 and energizes the right pilot lamp 22c. In step S154, the ECU 24 energizes the rear light 54. In step S155, the ECU 24 sets the rear light 54 as the operation target device.

5-3-5. Leftward Direction

Figure 27:
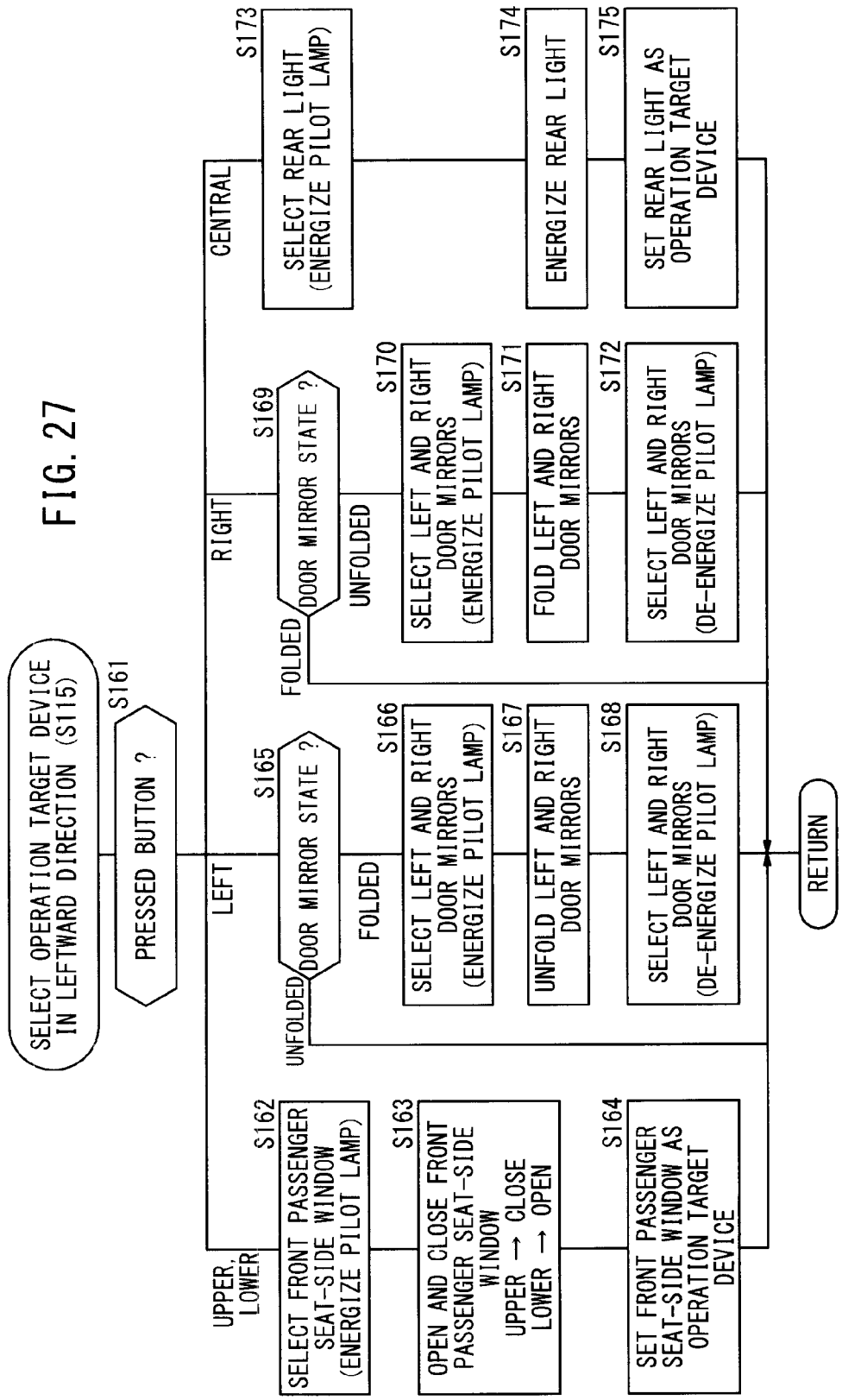
FIG. 27 is a flowchart of an operation sequence for selecting an operation target device when the viewing direction of the driver is a leftward direction.

FIG. 27 is a flowchart of a sequence of operations for selecting an operation target device when the viewing direction X of the driver 100 is the leftward direction (area A4) (details of S115 in FIG. 23). In step S161, the ECU 24 judges whether the pressed button on the cross key 18 is the central button 30, the upper button 32, the lower button 34, the right button 38, or the left button 36.

If the pressed button is the upper button 32 or the lower button 34, then in step S162, the ECU 24 selects the front passenger seat-side window 58 and energizes the left pilot lamp 22d. In step S163, the ECU 24 opens or closes the front passenger seat-side window 58. More specifically, if the lower button 34 is pressed, the ECU 24 opens the front passenger seat-side window 58, and if the upper button 32 is pressed, the ECU 24 closes the front passenger seat-side window 58. In step S164, the ECU 24 sets the front passenger seat-side window 58 as the operation target device.

If the pressed button is the left button 36, then in step S165, the ECU 24 confirms the state (unfolded or folded) of the door mirror 52. If the door mirror 52 is in an unfolded state, the ECU 24 brings the present operation sequence to an end. If the door mirror 52 is in a folded state, then in step S166, the ECU 24 selects both the left and right door mirrors 52 and energizes the left pilot lamp 22d.

In step S167, the ECU 24 unfolds the left and right door mirrors 52. In step S168, the ECU 24 selects the left and right door mirrors 52 and deenergizes the left pilot lamp 22d.

If the pressed button is the right button 38, then in step S169, the ECU 24 confirms the state (unfolded or folded) of the door mirror 52. If the door mirror 52 is in a folded state, the ECU 24 brings the present operation sequence to an end. If the door mirror 52 is in an unfolded state, then in step S170, the ECU 24 selects the left and right door mirrors 52 and energizes the left pilot lamp 22d.

In step S171, the ECU 24 folds the left and right door mirrors 52. In step S172, the ECU 24 selects the left and right door mirrors 52 and deenergizes the left pilot lamp 22d.

If the pressed button is the central button 30, then in step S173, the ECU 24 selects the rear light 54 and energizes the left pilot lamp 22d. In step S174, the ECU 24 energizes the rear light 54. In step S175, the ECU 24 sets the rear light 54 as the operation target device.

5-4. Operating an Operation Target Device (S5 in FIG. 11)

5-4-1. Summary

Figure 28:
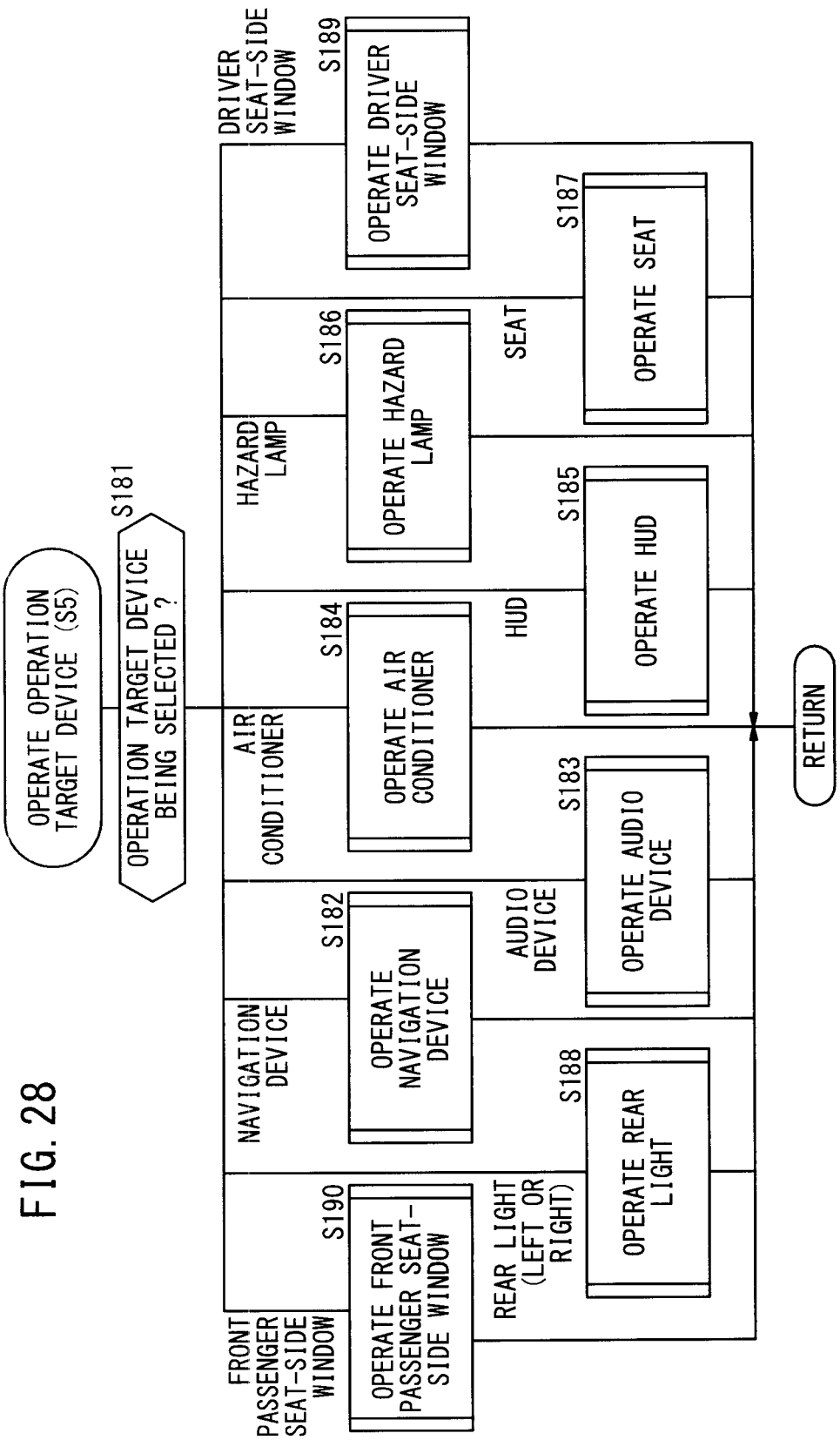
FIG. 28 is a flowchart of an operation sequence of the ECU for operating an operation target device.

FIG. 28 is a flowchart of a sequence of operations of the ECU 24 for operating a given operation target device (details of S5 in FIG. 11). In step S181, the ECU 24 confirms the operation target device, which has been selected in step S4 in FIG. 11. If the selected operation target device is the navigation device 40, the ECU 24 operates the navigation device 40 in step S182. If the selected operation target device is the audio device 42, the ECU 24 operates the audio device 42 in step S183. If the selected operation target device is the air conditioner 44, the ECU 24 operates the air conditioner 44 in step S184.

If the selected operation target device is the HUD 46, the ECU 24 operates the HUD 46 in step S185. If the selected operation target device is the hazard lamp 48, the ECU 24 operates the hazard lamp 48 in step S186. If the selected operation target device is the seat 50, the ECU 24 operates the seat 50 in step S187. If the selected operation target device is the rear light 54, the ECU 24 operates the rear light 54 in step S188. If the selected operation target device is the driver seat-side window 56, the ECU 24 operates the driver seat-side window 56 in step S189. If the selected operation target device is the front passenger seat-side window 58, the ECU 24 operates the front passenger seat-side window 58 in step S190.

5-4-2. Operations of Navigation Device 40

Figure 29:
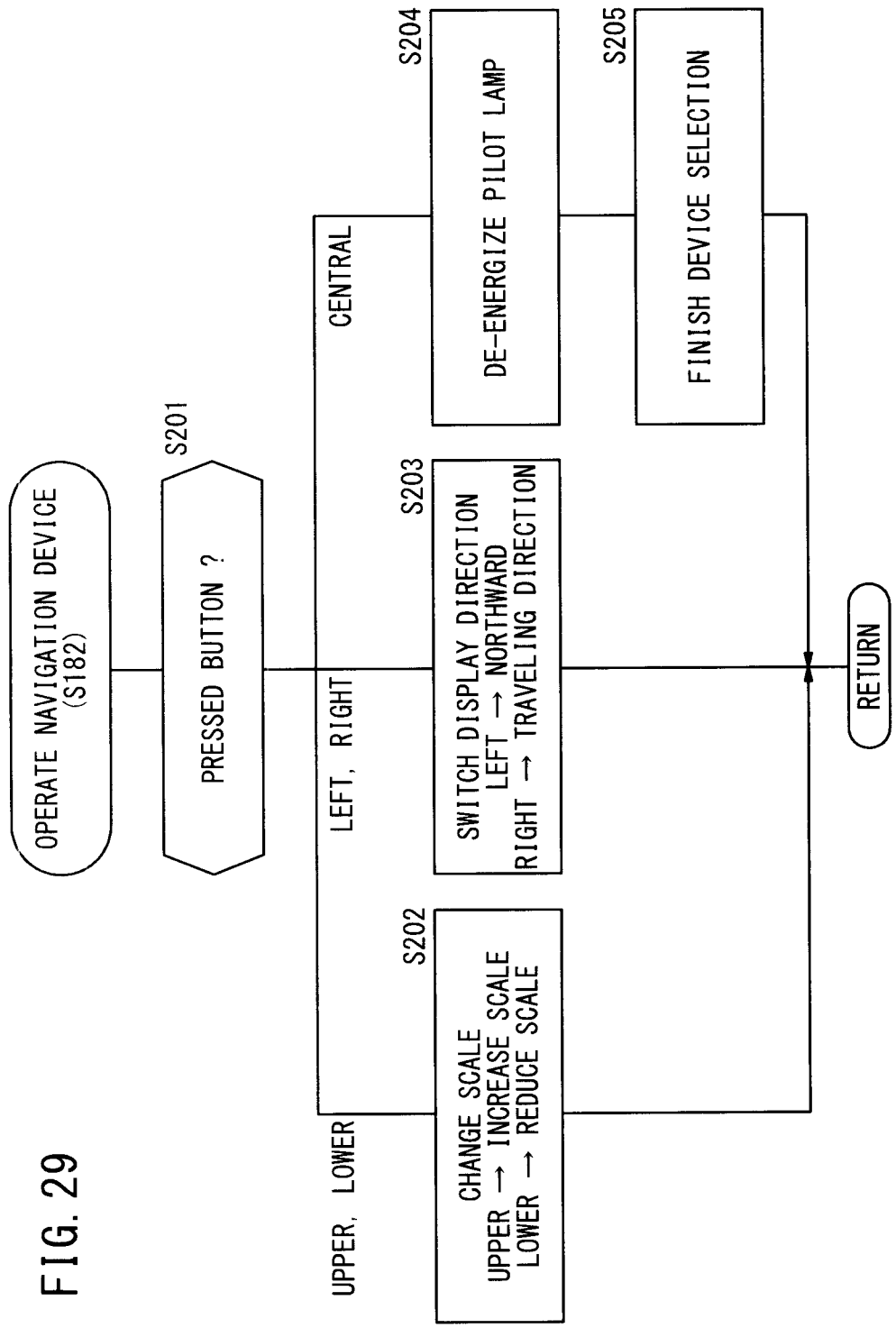
FIG. 29 is a flowchart of an operation sequence for operating a navigation device.

FIG. 29 is a flowchart of a sequence for operating the navigation device 40 (details of S182 in FIG. 28). In step S201, the ECU 24 judges whether the pressed button on the cross key 18 is the central button 30, the upper button 32, the lower button 34, the left button 36, or the right button 38.

If the pressed button is the upper button 32 or the lower button 34, then in step S202, the ECU 24 changes the display scale of the navigation device 40. More specifically, if the upper button 32 is pressed, the ECU 24 increases the display scale, and if the lower button 34 is pressed, the ECU 24 reduces the display scale.

If the pressed button is the left button 36 or the right button 38, then in step S203, the ECU 24 switches the navigation device 40 from one display direction to another display direction. More specifically, if the left button 36 is pressed, the ECU 24 switches to a northward display direction, and if the right button 38 is pressed, the ECU 24 switches to a display direction that is indicative of the traveling direction of the vehicle 10.

If the pressed button is the central button 30, then in step S204, the ECU 24 deenergizes the central pilot lamp 22a. In step S205, the ECU 24 finishes selecting the operation target device.

5-4-3. Operations of Audio Device 42

Figure 30:
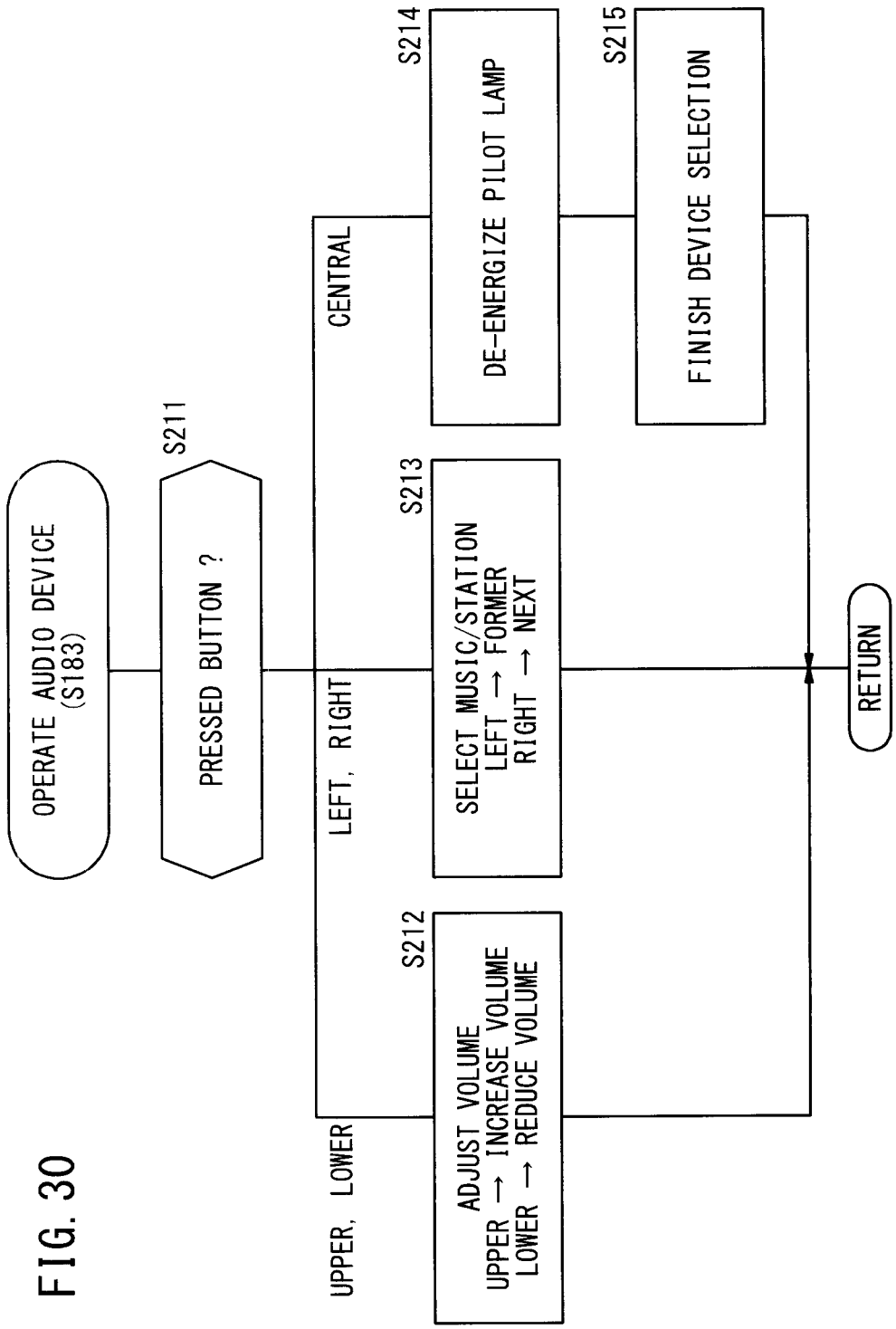
FIG. 30 is a flowchart of an operation sequence for operating an audio device.

FIG. 30 is a flowchart of a sequence for operating the audio device 42 (details of S183 in FIG. 28). In step S211, the ECU 24 judges whether the pressed button on the cross key 18 is the central button 30, the upper button 32, the lower button 34, the left button 36, or the right button 38.

If the pressed button is the upper button 32 or the lower button 34, then in step S212, the ECU 24 adjusts the volume of the audio device 42. More specifically, if the upper button 32 is pressed, the ECU 24 increases the volume, and if the lower button 34 is pressed, the ECU 24 reduces the volume.

If the pressed button is the left button 36 or the right button 38, then in step S213, the ECU 24 switches the audio device 42 from one piece of music to another piece of music, or from one station to another station. More specifically, if the left button 36 is pressed, the ECU 24 switches to a former piece of music or a preceding station, and if the right button 38 is pressed, the ECU 24 switches to a next piece of music or a next station.

If the pressed button is the central button 30, then in step S214, the ECU 24 deenergizes the central pilot lamp 22a. In step S215, the ECU 24 finishes selecting the operation target device.

5-4-4. Operations of Air Conditioner 44

Figure 31:
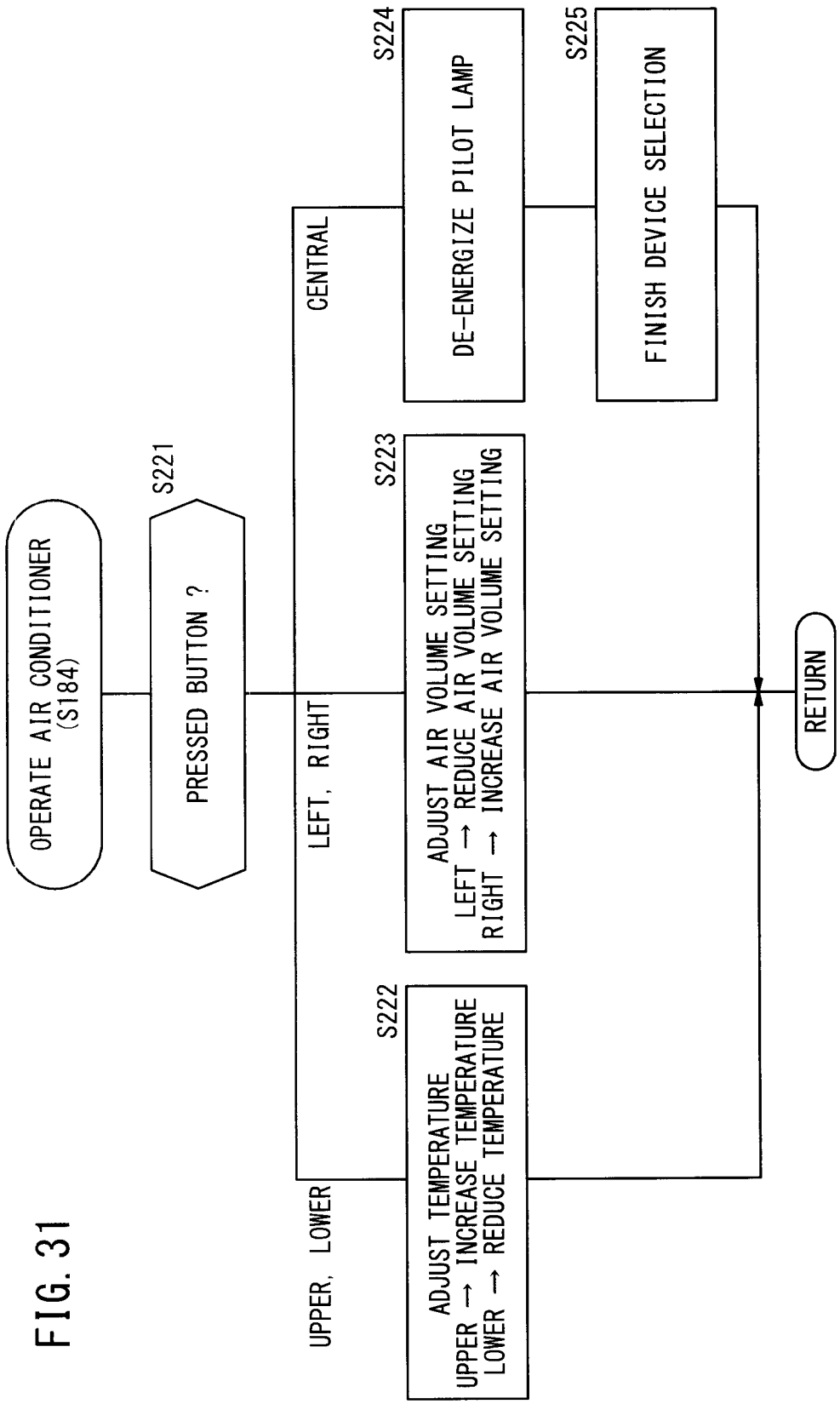
FIG. 31 is a flowchart of an operation sequence for operating an air conditioner.

FIG. 31 is a flowchart of a sequence for operating the air conditioner 44 (details of S184 in FIG. 28). In step S221, the ECU 24 judges whether the pressed button on the cross key 18 is the central button 30, the upper button 32, the lower button 34, the left button 36, or the right button 38.

If the pressed button is the upper button 32 or the lower button 34, then in step S222, the ECU 24 adjusts the temperature setting of the air conditioner 44. More specifically, if the upper button 32 is pressed, the ECU 24 increases the temperature setting, and if the lower button 34 is pressed, the ECU 24 reduces the temperature setting.

If the pressed button is the left button 36 or the right button 38, then in step S223, the ECU 24 adjusts the air volume setting of the air conditioner 44. More specifically, if the left button 36 is pressed, the ECU 24 reduces the air volume setting, and if the right button 38 is pressed, the ECU 24 increases the air volume setting.

If the pressed button is the central button 30, then in step S224, the ECU 24 deenergizes the central pilot lamp 22a. In step S225, the ECU 24 finishes selecting the operation target device.

5-4-5. Operations of HUD 46

Figure 32:
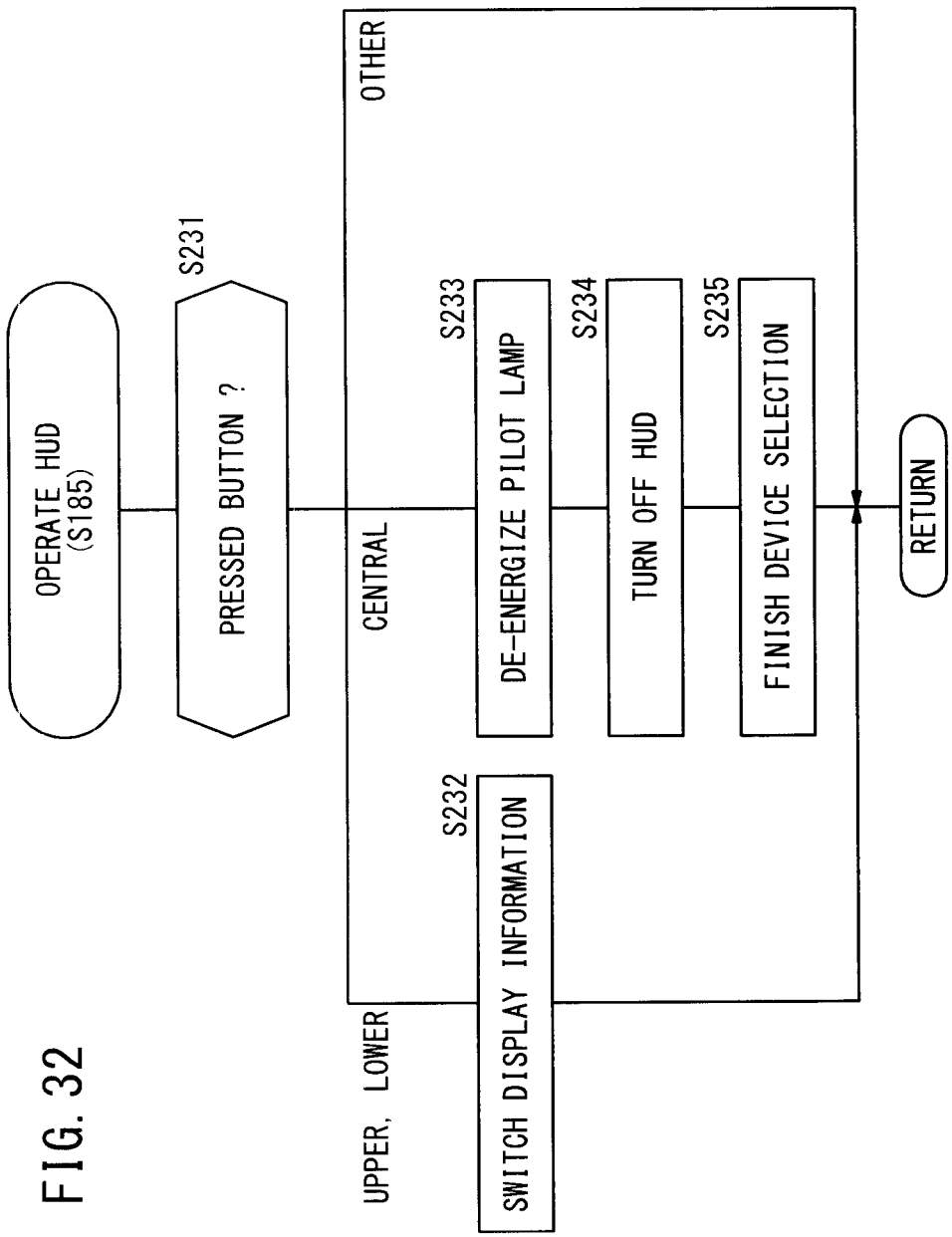
FIG. 32 is a flowchart of an operation sequence for operating the HUD.

FIG. 32 is a flowchart of a sequence for operating the HUD 46 (details of S185 in FIG. 28). In step S231, the ECU 24 judges whether the pressed button on the cross key 18 is the central button 30, the upper button 32, the lower button 34, or any other button.

If the pressed button is the upper button 32 or the lower button 34, then in step S232, the ECU 24 switches from one displayed item to another displayed item on the HUD 46. For example, if the upper button 32 is pressed, the ECU 24 switches from one displayed item to another displayed item according to a sequence from the vehicle speed 110, to the traveled distance 112, to the mileage 114, to the vehicle speed 110, to the traveled distance 112, to . . . (see FIG. 7C). Conversely, if the lower button 34 is pressed, the ECU 24 switches from one displayed item to another displayed item according to a sequence from the vehicle speed 110, to the mileage 114, to the traveled distance 112, to the vehicle speed 110, to the mileage 114 to, . . . .

If the pressed button is the central button 30, then in step S233, the ECU 24 deenergizes the front pilot lamp 22b. In step S234, the ECU 24 turns off the HUD 46. In step S235, the ECU 24 finishes selecting the operation target device.

If the pressed button is one of the other buttons (the left button 36 or the right button 38), the ECU 24 brings the present operation sequence to an end.

5-4-6. Operations of Hazard Lamp 48

Figure 33:
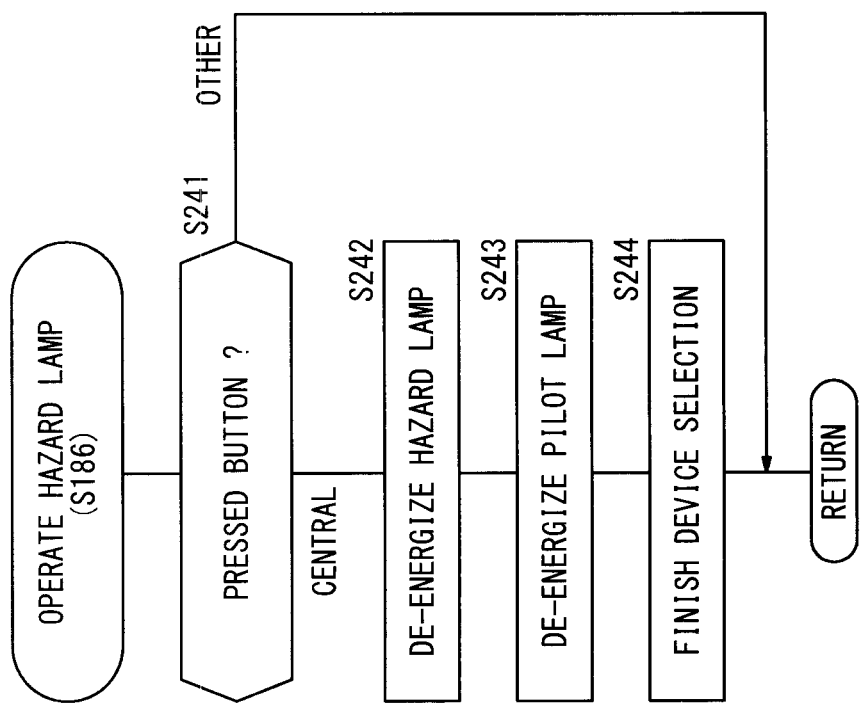
FIG. 33 is a flowchart of an operation sequence for operating a hazard lamp.

FIG. 33 is a flowchart of a sequence for operating the hazard lamp 48 (details of S186 in FIG. 28). In step S241, the ECU 24 judges whether the pressed button on the cross key 18 is the central button 30 or any other button.

If the pressed button is the central button 30, then in step S242, the ECU 24 deenergizes the hazard lamp 48. In step S243, the ECU 24 deenergizes the front pilot lamp 22b. In step S244, the ECU 24 finishes selecting the operation target device.

If the pressed button is one of the other buttons (the upper button 32, the lower button 34, the left button 36, or the right button 38), the ECU 24 brings the present operation sequence to an end.

5-4-7. Operations of the Seat 50

Figure 34:
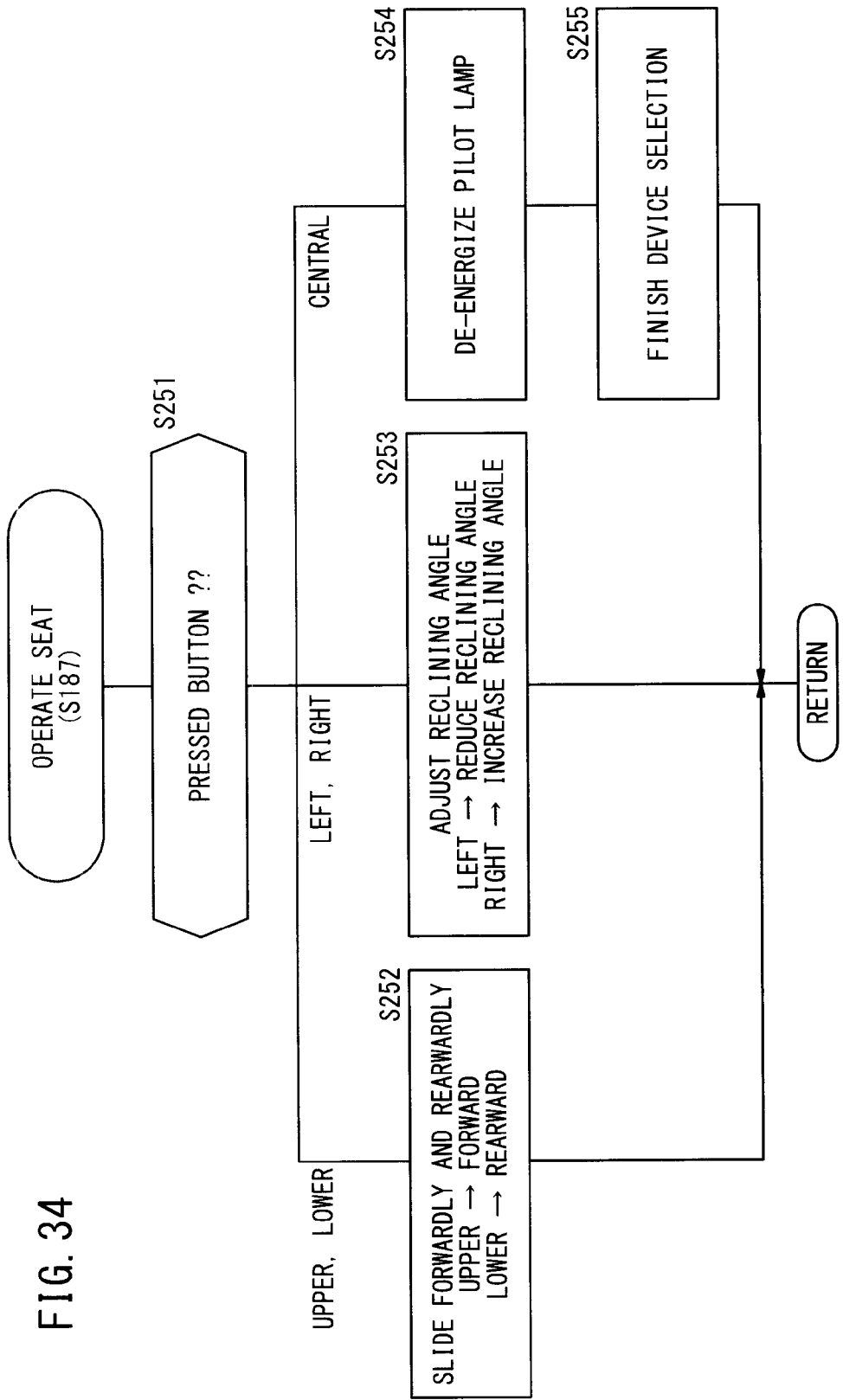
FIG. 34 is a flowchart of an operation sequence for operating a driver seat.

FIG. 34 is a flowchart of a sequence for operating the seat 50 of the driver 100 (details of S187 in FIG. 28). In step S251, the ECU 24 judges whether the pressed button on the cross key 18 is the central button 30, the upper button 32, the lower button 34, the left button 36, or the right button 38.

If the pressed button is the upper button 32 or the lower button 34, then in step S252, the ECU 24 slides the seat 50 forward or rearward. More specifically, if the upper button 32 is pressed, the ECU 24 slides the seat 50 forward, and if the lower button 34 is pressed, the ECU 24 slides the seat 50 rearward.

If the pressed button is the left button 36 or the right button 38, then in step S253, the ECU 24 adjusts the reclining angle of the seat 50. More specifically, if the left button 36 is pressed, the ECU 24 reduces the reclining angle, and if the right button 38 is pressed, the ECU 24 increases the reclining angle.

If the pressed button is the central button 30, then in step S254, the ECU 24 deenergizes the front pilot lamp 22b. In step S255, the ECU 24 finishes selecting the operation target device.

5-4-8. Operation of Rear Light 54

Figure 35:
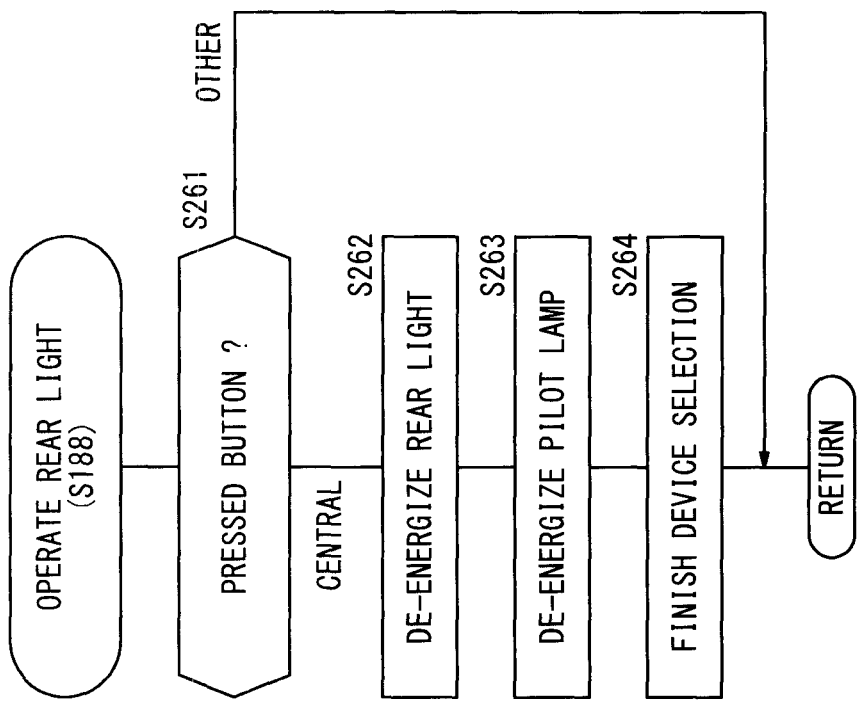
FIG. 35 is a flowchart of an operation sequence for operating a rear light.

FIG. 35 is a flowchart of a sequence for operating the rear light 54 (details of S188 in FIG. 28). In step S261, the ECU 24 judges whether the pressed button on the cross key 18 is the central button 30 or any other button.

If the pressed button is the central button 30, then in step S262, the ECU 24 deenergizes the rear light 54. In step S263, the ECU 24 deenergizes the right pilot lamp 22c or the left pilot lamp 22d, which has been energized up to this point. In step S264, the ECU 24 finishes the selection of the operation target device.

If the pressed button is one of the other buttons (the upper button 32, the lower button 34, the left button 36, or the right button 38), the ECU 24 brings the present operation sequence to an end.

5-4-9. Operations of Driver Seat-Side Window 56

Figure 36:
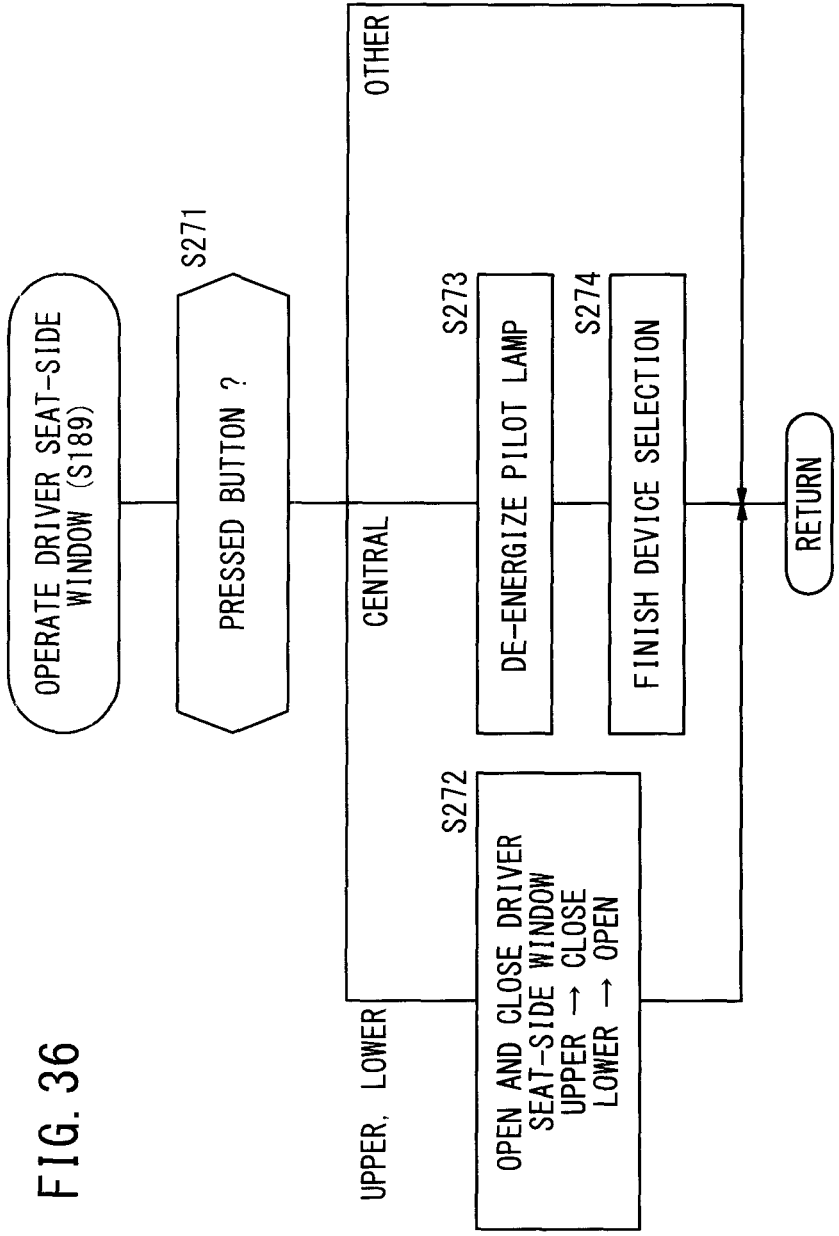
FIG. 36 is a flowchart of an operation sequence for operating a driver seat-side window.

FIG. 36 is a flowchart of a sequence for operating the driver seat-side window 56 (details of S189 in FIG. 28). In step S271, the ECU 24 judges whether the pressed button on the cross key 18 is the central button 30, the upper button 32, the lower button 34, or any other button.

If the pressed button is the upper button 32 or the lower button 34, then in step S272, the ECU 24 opens or closes the driver seat-side window 56. More specifically, if the lower button 34 is pressed, the ECU 24 opens the driver seat-side window 56, and if the upper button 32 is pressed, the ECU 24 closes the driver seat-side window 56.

If the pressed button is the central button 30, then in step S273, the ECU 24 deenergizes the right pilot lamp 22c. In step S274, the ECU 24 finishes selecting the operation target device.

If the pressed button is one of the other buttons (the left button 36 or the right button 38), the ECU 24 brings the present operation sequence to an end.

5-4-10. Operations of Front Passenger Seat-Side Window 58

Figure 37:
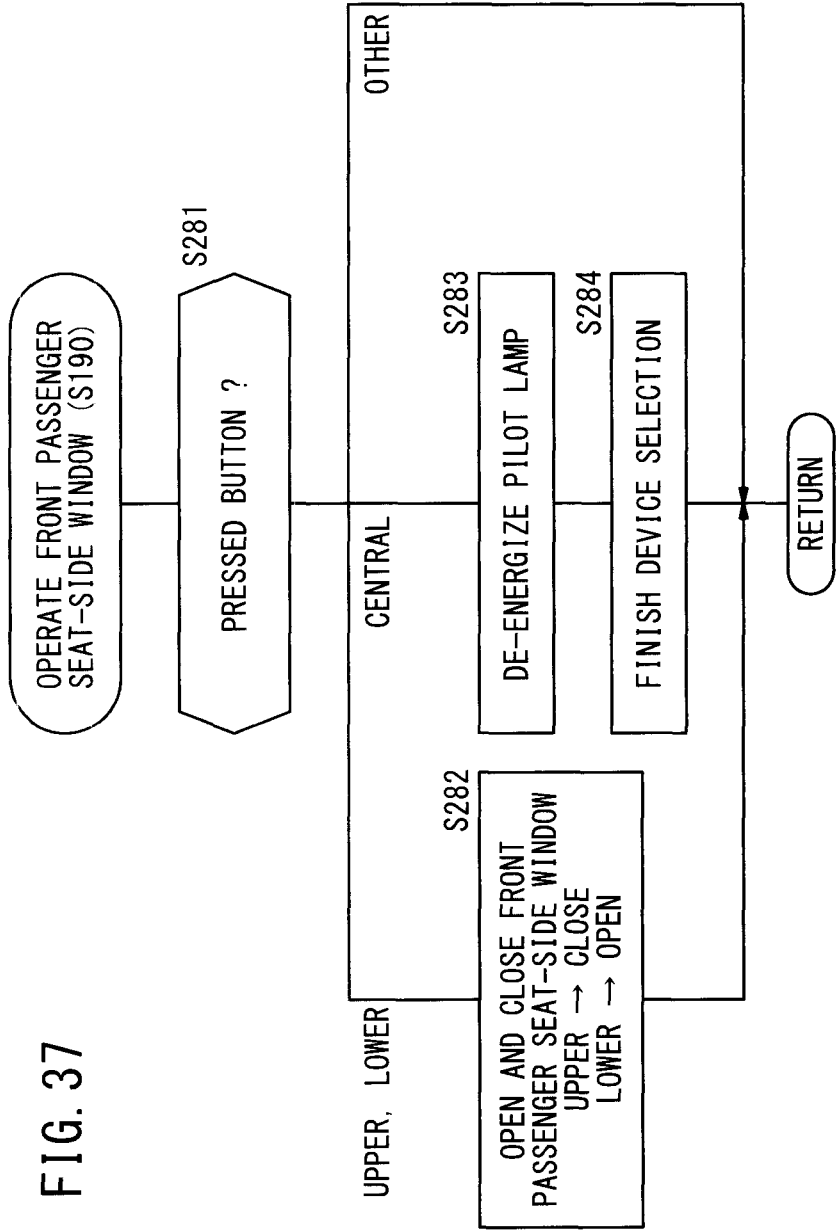
FIG. 37 is a flowchart of an operation sequence for operating a front passenger seat-side window.

FIG. 37 is a flowchart of a sequence for operating the front passenger seat-side window 58 (details of S189 in FIG. 28). In step S281, the ECU 24 judges whether the pressed button on the cross key 18 is the central button 30, the upper button 32, the lower button 34, or any other button.

If the pressed button is the upper button 32 or the lower button 34, then in step S282, the ECU 24 opens or closes the front passenger seat-side window 58. More specifically, if the lower button 34 is pressed, the ECU 24 opens the front passenger seat-side window 58, and if the upper button 32 is pressed, the ECU 24 closes the front passenger seat-side window 58.

If the pressed button is the central button 30, then in step S283, the ECU 24 deenergizes the left pilot lamp 22d. In step S284, the ECU 24 finishes selecting the operation target device.

If the pressed button is one of the other buttons (the left button 36 or the right button 38), the ECU 24 brings the present operation sequence to an end.

6. Advantages of the Present Embodiment

According to the present embodiment, as described above, a vehicle-mounted device group (groups A through D) is identified based on the direction of the face 122 and the direction of the eyeball 120 of the driver 100. Therefore, it is possible to achieve at least one of increased accuracy in detecting an operation target device, prevention of erroneous judgments, and reduction in cost.

For example, since the eyeball direction is used, detection accuracy is made higher than if an operation target were identified only from the facial direction. Since the image of the face 122, which is greater in size than the iris 124 or the pupil 130, is used, the direction can be identified easily, and detection accuracy is increased, and the processing sequence is made simpler than if an operation target device were identified only from the direction of the iris 124 or the pupil 130. Inasmuch as the direction of the eyeball 120 is detected and used together with the direction of the face 122, it is possible to make the detection accuracy lower than if only the detection of the direction of the eyeball 120 were used. In view of this fact, it also is possible to simplify the processing sequence.

According to the present embodiment, when the iris 124 or the pupil 130 is positioned in the right area E3 and the face 122 is directed to the left, or when the iris 124 or the pupil 130 is positioned in the left area E2 and the face 122 is directed to the right, a vehicle-mounted device group (from among groups A through D) is identified, which is disposed in an area E that is identified based on the direction of the face 122 detected by the facial direction detecting function 80 (see FIGS. 21 and 22C). When the facial direction and the eyeball direction are opposite to each other, it is considered that the driver 100 is trying to see a certain vehicle-mounted device 20. Consequently, it is possible to prevent erroneous operations from occurring due to identifying an operation target device when the operation target device does not need to be identified.

Further, according to the present embodiment, when the direction of the eyeball 120 is not detected, a vehicle-mounted device group (from among groups A through D) is identified, which is disposed in an area E that is identified based on the direction of the face 122 detected by the facial direction detecting function 80 (S17 in FIG. 12). Since an operation target device can be identified based only on the direction of the face 122 when the eyeball 120 is not detected, it is possible to eliminate instances in which the vehicle-mounted device operating apparatus 12 cannot be used.

According to the present embodiment, the facial direction detecting function 80 detects the direction of the face 122 (or finalizes the detected direction of the face 122) when the direction of the face 122 remains unchanged for a first time T1, and the eyeball direction detecting function 82 detects the direction of the eyeball 120 (or finalizes the detected direction of the eyeball 120) when the iris 124 or the pupil 130 is positioned in the same area E for a second time T2. The first time T1 is shorter than the second time T2. Generally, it is easier to change the direction of the eyeball 120 than to change the direction of the face 122, and thus, while the driver 100 is driving the vehicle 10, the direction of the eyeball 120 is likely to change relatively frequently because the driver 100 needs to acquire various items of information concerning other vehicles, pedestrians, and traffic signals. According to the present embodiment, the time required to detect (identify) the direction of the eyeball 120 is longer than the time required to detect (identify) the direction of the face 122. Therefore, it is easier to prevent a vehicle-mounted device 20 from being identified in error due to short-term movements of the eyeball 120, which are not intended to identify an operation target device.

7. Modifications

The present invention is not limited to the above embodiment, but various alternative arrangements may be adopted based on the disclosed content of the present description. For example, the present invention may employ the following arrangements.

7-1. Carriers

According to the above embodiment, the operating apparatus 12 is incorporated in the vehicle 10. However, the operating apparatus 12 may be incorporated in other types of carriers. For example, the operating apparatus 12 may be incorporated in mobile bodies such as ships, airplanes, etc. The operating apparatus 12 is not necessarily incorporated in mobile bodies, but may be incorporated in other apparatus insofar as such apparatus need to identify the viewing direction of a person being observed.

7-2. Detection of Viewing Direction

A passenger whose viewing direction X is to be detected is not limited to the driver 100, but may be another passenger (a passenger sitting in the front passenger seat, or a passenger sitting in a rear seat, etc.)

Figure 38:
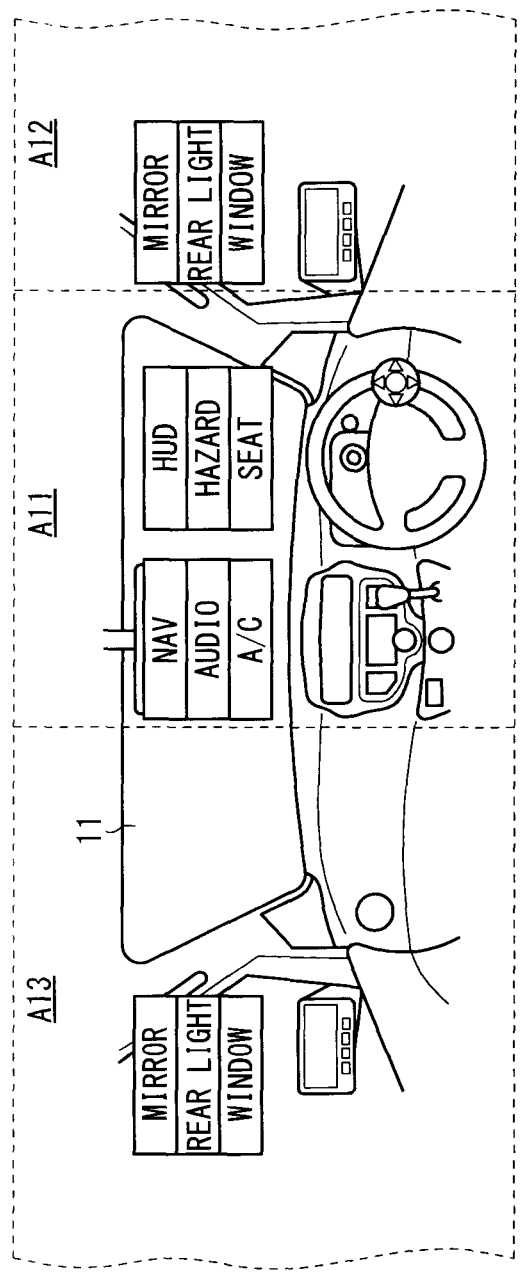
FIG. 38 is a view showing a front windshield area, which is divided into three regions, according to a first modification of FIG. 5.
Figure 39:
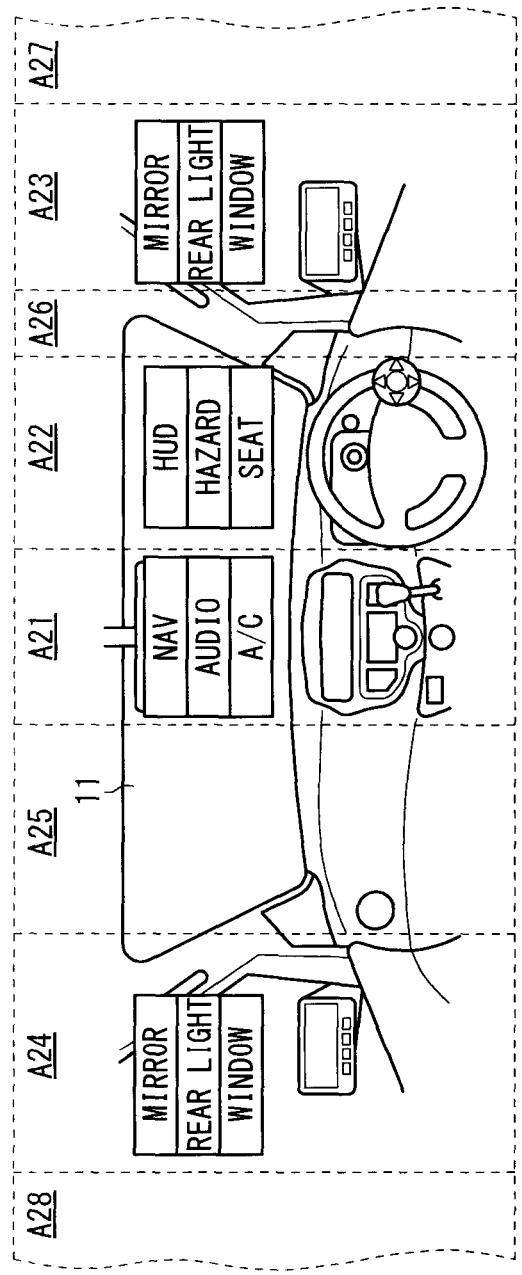
FIG. 39 is a view showing a front windshield area, which is divided into eight regions, according to a second modification of FIG. 5.

According to the above embodiment, the front windshield 11 area is divided into five areas A1 through A5 (FIG. 5). However, the number of areas is not limited to the illustrated number of five. As shown in FIG. 38, the front windshield 11 area may be divided into three areas A11 through A13. Alternatively, as shown in FIG. 39, the front windshield 11 area may be divided into eight areas A21 through A28.

According to the above embodiment, the second time T2, which is required to detect or finalize detection of the eyeball direction, is longer than the first time T1, which is required to detect or finalize detection of the facial direction. However, the second time T2 may be shorter than the first time T1. If the time required to detect or finalize detection of the eyeball direction is shortened, then the eyeball direction may be changed in a relatively short period of time while determining a certain vehicle-mounted device (groups A through D) as an operation target. It is thus possible to increase the degree of freedom of movement of the eyeball, which can be used for reasons other than to identify an operation target. The first time T1 may be of a value ranging from 0.5 to 2.0 seconds, for example, and the second time T2 may be of a value ranging from 0.5 to 1.0 seconds. The first time T1 can be longer than the second time T2 by a prescribed value (e.g., in a range from twice to ten times).

7-3. Identification of Operation Target Device

According to the above embodiment, an operation target device is identified along the widthwise direction of the vehicle 10 based on the facial direction and the eyeball direction, and also is identified along the heightwise direction of the vehicle 10 by operating the cross key 18. However, the present invention is not limited to such a process, insofar as an operation target device is capable of being identified along the widthwise direction based on the facial direction and the eyeball direction. An operation target device may also be identified along the heightwise direction of the vehicle 10 based on the facial direction and the eyeball direction. Alternatively, only one vehicle-mounted device 20 within each area may be identified along the heightwise direction, and then a vehicle-mounted device 20 may be identified along the widthwise direction.

According to the above embodiment, an operation target device is identified using the flowcharts shown in FIGS. 11, 12, 16, and 23 through 27. However, the process of identifying an operation target device is not limited to the disclosed embodiment, insofar as a vehicle-mounted device group (groups A through D) is identified along the widthwise direction of the vehicle 10, and an operation target device is identified along the heightwise direction of the vehicle 10. According to the flowchart shown in FIG. 11, step S2 judges whether or not one of the buttons on the cross key 18 has been pressed. However, such a judgment step may be dispensed with (e.g., step S2 may be combined with step S111 shown in FIG. 23). According to the flowcharts shown in FIGS. 24 through 27, a pilot lamp 22 corresponding to a selected operation target device is energized. However, a pilot lamp 22 need not necessarily be energized.

7-4. Operation Means

According to the above embodiment, the cross key 18 is used as a means (operation means) that is operated by the driver 100 (passenger) to identify an operation target device. However, such an operation means is not limited to the cross key 18, in view of the fact that vehicle-mounted devices 20, which are vertically arranged in each of the vehicle-mounted device groups (groups A through D), are identified or selected. Although the cross key 18 according to the above embodiment includes the central button 30, the upper button 32, the lower button 34, the left button 36, and the right button 38, the cross key 18 may have only the upper button 32 and the lower button 34, or only the central button 30, the upper button 32, and the lower button 34. Alternatively, the buttons may be joined together (e.g., a cross button pad as shown in FIG. 4 of JP2010-105417A may be used). Each of the buttons on the cross key 18 comprises a pushbutton switch (see FIG. 3). However, the buttons may be constituted by other types of switches, including a slide switch, a lever switch, or the like.

According to the above embodiment, the cross key 18 serves as a means for identifying an operation target device from among the vehicle-mounted device groups (groups A through D), as well as a means for operating the identified operation target device. However, a different means for operating the identified operation target device may be provided separately.

According to the above embodiment, the cross key 18 is mounted on the steering wheel 16. However, the cross key 18 is not limited to such a position, and may be disposed in a position such as on the steering column or on an instrument panel.

7-5. Vehicle-Mounted Devices 20 and Vehicle-Mounted Device Groups

According to the above embodiment, the vehicle-mounted devices 20 include the navigation device 40, the audio device 42, the air conditioner 44, the HUD 46, the hazard lamp 48, the seat 50, the door mirrors 52, the rear lights 54, the driver seat-side window 56, and the front passenger seat-side window 58. However, the vehicle-mounted devices 20 are not limited to such devices, but may be a plurality of vehicle-mounted devices, which are operable by passengers in the vehicle 10, insofar as the devices are arranged in the widthwise direction of the vehicle. Further, a single vehicle-mounted device may be disposed in each of the areas A1 through A5.

What is claimed is:

1. A vehicle-mounted device identifying apparatus comprising:
    a plurality of vehicle-mounted devices mounted on a vehicle;
    an image capturing unit mounted on the vehicle for capturing an image including a passenger in the vehicle;
    a facial direction detecting unit for detecting a direction of a face (hereinafter referred to as a "facial direction") of the passenger in a widthwise direction of the vehicle based on the image captured by the image capturing unit;
    an eyeball direction detecting unit for detecting a direction of an eyeball (hereinafter referred to as an "eyeball direction") of the passenger in the widthwise direction of the vehicle based on the image captured by the image capturing unit; and
    a vehicle-mounted device identifying unit for identifying one of the vehicle-mounted devices based on the facial direction detected by the facial direction detecting unit, wherein:
    the vehicle-mounted devices are arranged along the widthwise direction and are divided into a plurality of vehicle-mounted device groups assigned to respective areas along the widthwise direction;
    the eyeball direction detecting unit recognizes an outer corner and an inner corner, and an iris or a pupil of the eye of the passenger from the image, divides the eye into a right area, a left area, and a central area between the outer corner and the inner corner, and detects whether the iris or the pupil is positioned in the right area, the left area, or the central area;
    the vehicle-mounted device identifying unit identifies one of the vehicle-mounted devices, which is disposed in one of the areas that is on the right side of one of the areas that is identified based on the facial direction detected by the facial direction detecting unit, if the eyeball direction detecting unit detects that the iris or the pupil is positioned in the right area;
    the vehicle-mounted device identifying unit identifies one of the vehicle-mounted devices, which is disposed in one of the areas that is on the left side of one of the areas that is identified based on the facial direction detected by the facial direction detecting unit, if the eyeball direction detecting unit detects that the iris or the pupil is positioned in the left area; and
    the vehicle-mounted device identifying unit identifies one of the vehicle-mounted devices, which is disposed in one of the areas that is identified based on the facial direction detected by the facial direction detecting unit, if the eyeball direction detecting unit detects that the iris or the pupil is positioned in the central area.

2. The vehicle-mounted device identifying apparatus according to claim 1, wherein the vehicle-mounted device identifying unit identifies one of the vehicle-mounted devices, which is disposed in one of the areas that is identified based on the facial direction detected by the facial direction detecting unit, if the iris or the pupil is positioned in the right area and the face is directed to the left from a frontal direction, and if the iris or the pupil is positioned in the left area and the face is directed to the right from the frontal direction.

3. The vehicle-mounted device identifying apparatus according to claim 1, wherein the vehicle-mounted device identifying unit identifies one of the vehicle-mounted devices, which is disposed in one of the areas that is identified based on the facial direction detected by the facial direction detecting unit, if the image capturing unit does not detect the eyeball.

4. The vehicle-mounted device identifying apparatus according to claim 1, wherein the facial direction detecting unit detects the facial direction when the facial direction remains unchanged for a first prescribed time;
the eyeball direction detecting unit detects the eyeball direction when the iris or the pupil is positioned in one area for a second prescribed time; and
the first prescribed time is shorter than the second prescribed time.

5. The vehicle-mounted device identifying apparatus according to claim 1, wherein the facial direction detecting unit detects the facial direction when the facial direction remains unchanged for a first prescribed time;
the eyeball direction detecting unit detects the eyeball direction when the iris or the pupil is positioned in one area for a second prescribed time; and
the first prescribed time is longer than the second prescribed time.

6. A vehicle-mounted device identifying apparatus comprising:
a plurality of vehicle-mounted devices arranged along a widthwise direction of a vehicle;
an image capturing unit mounted on the vehicle for capturing an image including a passenger in the vehicle;
a facial direction detector for detecting a direction of a face (hereinafter referred to as a "facial direction") of the passenger in a widthwise direction of the vehicle based on the image;
an eyeball direction detector for detecting a direction of an eyeball (hereinafter referred to as an "eyeball direction") of the passenger with respect to the face of the passenger in the widthwise direction of the vehicle based on the image; and
a vehicle-mounted device identifier for identifying an operation target from the vehicle-mounted devices based on the facial direction and the eyeball direction, wherein:
the vehicle-mounted device identifier identifies the operation target from one or more of the vehicle-mounted devices, which are on the right side of one of the vehicle-mounted devices that is positioned in the facial direction, if the eyeball direction is rightward of a first position that is on the right side of a frontal direction of the face of the passenger as viewed from an observer of the face;
the vehicle-mounted device identifier identifies the operation target from one or more of the vehicle-mounted devices, which are on the left side of one of the vehicle-mounted devices that is positioned in the facial direction, if the eyeball direction is leftward of a second position that is on the left side of the frontal direction of the face of the passenger as viewed from the observer of the face; and
the vehicle-mounted device identifier identifies the operation target from one or more of the vehicle-mounted devices, which are positioned in the facial direction, if the eyeball direction lies between the first position and the second position as viewed from the observer of the face.

7. The vehicle-mounted device identifying apparatus according to claim 6, wherein the vehicle-mounted device identifier identifies the operation target from one or more of the vehicle-mounted devices, which are positioned in the facial direction, if the eyeball direction is rightward of the first position as viewed from the observer of the face and the face is directed to the left from the frontal direction, or if the eyeball direction is leftward of the second position as viewed from the observer of the face and the face is directed to the right from the frontal direction.

* * * * *